United States Patent
Whitley

(10) Patent No.: US 12,254,727 B2
(45) Date of Patent: Mar. 18, 2025

(54) MULTI-CHANNEL SIGNALING FOR A BARRIER OPERATOR SYSTEM

(71) Applicant: GMI Holdings, Inc., Mt. Hope, OH (US)

(72) Inventor: Robert M. Whitley, Benbrook, TX (US)

(73) Assignee: GMI Holdings, Inc., Mt. Hope, OH (US)

( * ) Notice: Subject to any disclaimer, the term of this patent is extended or adjusted under 35 U.S.C. 154(b) by 94 days.

(21) Appl. No.: 18/058,143

(22) Filed: Nov. 22, 2022

(65) Prior Publication Data

US 2023/0162549 A1 May 25, 2023

Related U.S. Application Data

(60) Provisional application No. 63/282,838, filed on Nov. 24, 2021.

(51) Int. Cl.
| | | |
|---|---|---|
| *G07C 9/00* | (2020.01) | |
| *E05F 15/77* | (2015.01) | |
| *G07C 9/10* | (2020.01) | |
| *G07C 9/21* | (2020.01) | |

(52) U.S. Cl.
CPC .......... *G07C 9/00309* (2013.01); *E05F 15/77* (2015.01); *G07C 9/10* (2020.01); *G07C 9/21* (2020.01); *G07C 2009/00928* (2013.01)

(58) Field of Classification Search
CPC .......... G07C 9/21; G07C 9/10; H04W 12/06; H04L 63/0428; H04L 9/32; G08C 2201/20
See application file for complete search history.

(56) References Cited

U.S. PATENT DOCUMENTS

| | | |
|---|---|---|
| 723,188 A | 3/1903 | Tesla |
| 725,605 A | 4/1903 | Tesla |
| 2,292,387 A | 8/1942 | Kiesler |
| 2,500,212 A | 3/1950 | Starr |

(Continued)

FOREIGN PATENT DOCUMENTS

| | | |
|---|---|---|
| GB | 2315892 A | 2/1998 |

OTHER PUBLICATIONS

International Searching Authority, International Search Report and the Written Opinion of the International Searching Authority, International Application No. PCT/US09/45317, Jul. 13, 2009, 11 pages.

*Primary Examiner* — Vernal U Brown
(74) *Attorney, Agent, or Firm* — Haynes and Boone, LLP

(57) ABSTRACT

A wireless transmitter for controlling a barrier operator includes at least one processor, an actuator, and a memory storing instructions. When executed by the at least one processor, the instructions cause the at least one processor to transmit a first data packet configured to initiate actuation of the barrier operator on a first channel and transmit the first data packet on a second channel. The transmission on the first channel may be performed in response to a first actuation of the actuator and the transmission on the second channel may be performed in response to a second actuation of the actuator. Alternatively, both transmissions may be performed in response to a single actuation of the actuator but switching from the first channel to the second channel may be performed in response to a passive input signal.

14 Claims, 25 Drawing Sheets

(56) References Cited

U.S. PATENT DOCUMENTS

| | | |
|---|---|---|
| 2,855,508 A | 10/1958 | Linden |
| 3,090,959 A | 5/1963 | Marmont |
| 3,870,959 A | 3/1975 | Wootton |
| 3,909,722 A | 9/1975 | Bennett, Jr. |
| 4,066,964 A | 1/1978 | Costanza |
| 4,255,742 A | 3/1981 | Gable |
| 4,763,592 A | 8/1988 | Russ |
| 4,850,036 A | 7/1989 | Smith |
| 4,890,108 A | 12/1989 | Drori |
| 4,893,338 A | 1/1990 | Pastor |
| 5,239,555 A | 8/1993 | Konig |
| 5,303,259 A | 4/1994 | Loveall |
| 5,404,374 A | 4/1995 | Mullins |
| 5,428,818 A | 6/1995 | Meidan |
| 5,471,503 A | 11/1995 | Altmaier |
| 5,473,318 A | 12/1995 | Martel |
| 5,519,381 A | 5/1996 | Marsh |
| RE35,364 E | 10/1996 | Heitschel |
| 5,680,134 A | 10/1997 | Tsui |
| 5,822,373 A | 10/1998 | Addy |
| 6,025,785 A | 2/2000 | Farris |
| 6,049,289 A | 4/2000 | Waggamon |
| RE36,703 E | 5/2000 | Heitschel |
| 6,078,271 A | 6/2000 | Roddy |
| 6,081,203 A | 6/2000 | Fitzgibbon |
| 6,249,673 B1 | 6/2001 | Tsui |
| 6,265,988 B1 | 7/2001 | LeMense |
| 6,300,880 B1 | 10/2001 | Sitnik |
| 6,339,706 B1 | 1/2002 | Tillgren |
| 6,384,710 B1 | 5/2002 | LeMense |
| 6,414,587 B1 | 7/2002 | Fitzgibbon |
| 6,456,726 B1 | 9/2002 | Yu |
| 6,486,795 B1 | 11/2002 | Sobel |
| RE37,986 E | 2/2003 | Heitschel |
| 6,609,010 B1 | 8/2003 | Dolle |
| 6,643,522 B1 | 11/2003 | Young |
| 6,737,823 B2 | 5/2004 | Reed |
| 6,810,123 B2 | 10/2004 | Farris |
| 6,822,603 B1 | 11/2004 | Crimmins |
| 6,850,910 B1 | 2/2005 | Yu |
| 6,854,058 B2 | 2/2005 | Carroll |
| 6,856,237 B1 | 2/2005 | Richmond |
| 6,903,650 B2 | 6/2005 | Murray |
| 6,963,267 B2 | 11/2005 | Murray |
| 6,990,317 B2 | 1/2006 | Arnold |
| 7,034,488 B2 | 4/2006 | Robb |
| 7,057,494 B2 | 6/2006 | Fitzgibbon |
| 7,061,428 B1 | 6/2006 | Amir |
| 7,068,181 B2 | 6/2006 | Chuey |
| 7,103,086 B2 | 9/2006 | Steed |
| 7,154,938 B2 | 12/2006 | Cumeralto |
| 7,173,514 B2 | 2/2007 | Mullet |
| 7,230,518 B2 | 6/2007 | Fitzgibbon |
| 7,280,031 B1 | 10/2007 | Rodriguez |
| 7,327,107 B2 | 2/2008 | Mullet |
| 7,327,249 B1 | 2/2008 | Murray |
| 7,375,612 B2 | 5/2008 | Murray |
| 7,551,675 B2 | 6/2009 | Kroeger |
| 7,555,030 B2 | 6/2009 | Fukuda |
| 7,589,615 B2 | 9/2009 | Keller, Jr. |
| 7,710,239 B2 | 5/2010 | Kranz |
| 7,747,232 B2 | 6/2010 | Gierl |
| 8,233,095 B2 | 7/2012 | Fisher |
| 8,284,021 B2 | 10/2012 | Farris |
| 8,331,928 B2 | 12/2012 | Scaletta |
| 8,468,236 B2 | 6/2013 | Nesse |
| 8,542,093 B2 | 9/2013 | Rodriguez |
| 8,581,695 B2 | 11/2013 | Carlson |
| 8,970,345 B2 | 3/2015 | Carlson |
| 9,483,935 B2 | 11/2016 | Carlson |
| 2001/0023483 A1 | 9/2001 | Kiyomoto |
| 2002/0184504 A1 | 12/2002 | Hughes |
| 2002/0191785 A1 | 12/2002 | McBrearty |
| 2003/0016119 A1 | 1/2003 | Teich |
| 2003/0056001 A1 | 3/2003 | Mate |
| 2003/0070092 A1 | 4/2003 | Hawkes |
| 2003/0072445 A1 | 4/2003 | Kuhlman |
| 2003/0147536 A1 | 8/2003 | Andivahis |
| 2003/0151496 A1 | 8/2003 | Study |
| 2003/0177237 A1 | 9/2003 | Stebbings |
| 2003/0214385 A1 | 11/2003 | Murray |
| 2004/0019783 A1 | 1/2004 | Hawkes |
| 2004/0052374 A1 | 3/2004 | Lee |
| 2004/0066148 A1 | 4/2004 | Oskorep |
| 2004/0066277 A1 | 4/2004 | Murray |
| 2004/0181569 A1 | 9/2004 | Attar |
| 2005/0058153 A1 | 3/2005 | Santhoff |
| 2005/0197078 A1* | 9/2005 | Yoshimoto ............ H04B 1/406 455/552.1 |
| 2006/0103506 A1 | 5/2006 | Rodgers |
| 2006/0109078 A1 | 5/2006 | Keller, Jr. |
| 2006/0109079 A1 | 5/2006 | Mack |
| 2006/0132284 A1 | 6/2006 | Murphy |
| 2006/0176148 A1 | 8/2006 | Sommer |
| 2006/0181428 A1 | 8/2006 | Blaker |
| 2006/0186991 A1 | 8/2006 | Jankovsky |
| 2006/0250216 A1 | 11/2006 | Gagnon |
| 2007/0005806 A1 | 1/2007 | Fitzgibbon |
| 2007/0006319 A1 | 1/2007 | Fitzgibbon |
| 2007/0046231 A1 | 3/2007 | Mullet |
| 2007/0126552 A1 | 6/2007 | Fitzgibbon |
| 2007/0152798 A1 | 7/2007 | Witkowski |
| 2007/0273472 A1 | 11/2007 | Gregori |
| 2007/0294961 A1 | 12/2007 | Reed |
| 2008/0079603 A1 | 4/2008 | King |
| 2009/0021348 A1 | 1/2009 | Farris |
| 2010/0301999 A1* | 12/2010 | Carlson ............ G07C 9/00182 340/5.71 |
| 2013/0142269 A1* | 6/2013 | Witkowski ........... H04B 7/0689 375/259 |
| 2016/0267781 A1* | 9/2016 | Papay .................... G08C 17/02 |
| 2017/0350238 A1* | 12/2017 | Werkheiser ............. E21B 47/12 |
| 2020/0059456 A1* | 2/2020 | Witkowski ............ H04L 9/0894 |

* cited by examiner

MULTI-CHANNEL SIGNALING FOR A BARRIER OPERATOR SYSTEM

PRIORITY INFORMATION

This application claims the benefit of U.S. Provisional Application No. 63/282,838 filed Nov. 24, 2021 and entitled "Multi-Channel Signaling for a Barrier Operator System," the disclosure of which is hereby incorporated by reference in its entirety.

The present disclosure is related to co-pending U.S. application Ser. No. 17/992,741 filed Nov. 22, 2022 titled "Multi-Channel Signaling for a Barrier Operator System," incorporated herein by reference.

FIELD

The present disclosure is directed to remotely controlled barrier operator systems for opening and closing garage doors, gates and other barriers, and more particularly to wireless communication systems and methods for such barrier operator systems.

BACKGROUND

With few exceptions, barrier operator systems, such as those controlling upward acting sectional garage doors, rollup doors, gates, and other motor operated barriers, may be remotely controlled. Typically, they are remotely controlled by one or more building mounted or hand-held wireless remote-control devices such as radio frequency (RF) code transmitters. These RF transmitters, upon actuation by a user, usually send access codes and commands, via packetized data, to a receiver associated with the barrier operator. A controller unit also associated with the barrier operator then receives and decodes the data from the receiver. Upon receiving and decoding packet data and verifying an access code, a barrier operator then moves or stops the barrier, depending upon the command and/or a current operating state.

Communication protocols between a remote RF transmitter and an RF receiver of a barrier operator often use code-hopping encryption for the access codes, sometimes referred to as "rolling codes," to prevent code interception and unauthorized actuation of a barrier operator. Accordingly, a rolling code is transmitted as part of the packet data which is typically transmitted along a single fixed RF "channel." The term "channel" as used throughout this disclosure refers to a communication medium between the RF transmitter and RF receiver through which the packet data travels. Each channel may include a designated frequency signal along with any sidebands thereof.

A rolling or hopping code changes with each new transmission in accordance with a stored algorithm to prevent unauthorized capture and reuse of an access code, its security is dependent upon the secrecy of the encryption algorithm and of the secret key. A plurality of remote transmitters can be used to send an access code and other data to a single receiver integrated into a barrier operator.

The packetized data sent by the transmitters to receivers is typically tens to hundreds of milliseconds in length and the packet as a whole may be repeatedly transmitted in response to a single button press or for as long as a user actuates the transmitter. Because these RF transmissions are sent on a fixed, single RF channel, RF noise in the channel may cause reduced reception range. In order to improve the odds of a successful transmission, a transmitter may often need to be repeatedly actuated and/or the packet data repeatedly transmitted for an extended period. If the channel being utilized has heavy interference, then reception may be blocked and the wireless system rendered inoperative due to noise in the channel.

Therefore, there is a need for wireless communication, preferably for rolling code transmissions, to improve reception, security, and operation of barrier operator systems.

SUMMARY

Consistent with some examples, a wireless transmitter for controlling a barrier operator may include at least one processor, an antenna, and a memory storing instructions that, when executed by the at least one processor, cause the at least one processor to concurrently (a) transmit a first data packet configured to initiate actuation of the barrier operator on a first channel via the antenna and (b) transmit the first data packet on a second channel via the antenna.

In some examples, transmitting the first data packet may include transmitting a first plurality of instances of the first packet sequentially in response to a first actuation of a button of the wireless transmitter. Transmitting the first data packet on the second channel may include transmitting a second plurality of instances of the first data packet sequentially in response to the first actuation of the button.

The first data packet may include a first code segment. The memory further stores instructions that cause the at least one processor to generate a second code segment using a rolling code algorithm and insert the second code segment into a second data packet configured to initiate actuation of the barrier operator. In response to a second actuation of the button, the instructions may cause the at least one processor to cause the wireless transmitter to concurrently transmit the second data packet on the first channel via the antenna and transmit the second data packet on the second channel via the antenna.

In some examples, the wireless transmitter may include an encoder, a first oscillator, a second oscillator, a first modulator, a second modulator, and a diplexer. The encoder may be configured to encrypt at least a portion of the first data packet. The first oscillator may be configured to generate a first carrier wave at a frequency of the first channel and the second oscillator may be configured to generate a second carrier wave at a frequency of the second channel. The first modulator may be configured to modulate the first data packet into the first carrier wave and the second modulator configured to modulate the first data packet into the second carrier wave. The diplexer may be configured to multiplex the first carrier wave and second carrier wave to one common antenna.

Consistent with some examples, a wireless transmitter for controlling a barrier operator includes at least one processor, a first antenna and a second antenna, and a memory storing instructions. When executed by the at least one processor, the instructions may cause the at least one processor to concurrently transmit a first data packet configured to initiate actuation of the barrier operator on a first channel via the first antenna and transmit the first data packet on a second channel via the second antenna.

In some examples, transmitting the first data packet may include transmitting a first plurality of instances of the first packet sequentially in response to a first actuation of a button of the wireless transmitter. Transmitting the first data packet on the second channel via the second antenna may include transmitting a second plurality of instances of the first data packet sequentially in response to the first actuation of the button. The first data packet may include a first code segment. The memory may further store instructions that, when executed by the at least one processor, cause the at least one processor to generate a second code segment using a rolling code algorithm and insert the second code segment into a second data packet configured to initiate actuation of the barrier operator. In response to a second actuation of the button, the instructions may cause the one or more processors to concurrently transmit the second data packet on the first channel via the first antenna and transmit the second data packet on the second channel via the second antenna.

In some examples, a wireless transmitter may include an encoder, a first oscillator, a second oscillator, a first modulator, and a second modulator. The encoder may be configured to encrypt at least a portion of the first data packet. The first oscillator may be configured to generate a first carrier wave at a frequency of the first channel and the second oscillator may be configured to generate a second carrier wave at a frequency of the second channel. The first modulator may be configured to modulate the first data packet into the first carrier wave and the second modulator may be configured to modulate the first data packet into the second carrier wave.

Consistent with some examples, a wireless transmitter for controlling a barrier operator may include at least one processor, an actuator, and a memory storing instructions. When executed by the at least one processor, the instructions may cause the at least one processor to detect a first actuation of the actuator, transmit, in response to detecting the first actuation of the actuator, a first data packet configured to initiate actuation of the barrier operator on a first channel, detect a second actuation of the actuator, determine if the second actuation was detected within a dwell period of the first actuation of the actuator and transmit, if the second actuation was detected within the dwell period of the first actuation, the first data packet on a second channel.

In some examples, the memory may further store a channel order and instructions that, when executed by the at least one processor, cause the at least one processor to transmit the first data packet on the first channel in response to the first actuation of the actuator before transmitting the first data packet on the second channel in response to the second actuation of the actuator based on the channel order indicating the first channel is superior to the second channel. The memory may further store instructions that cause the at least one processor to modify the channel order to indicate the second channel is superior to the first channel based on determining that the second actuation was detected within the dwell period of the first actuation. The memory may further store instructions that cause the at least one processor to modify the channel order to indicate the second channel is superior to the first channel based on recognition of a pattern of use of the wireless transmitter. The pattern of use may indicate that a subsequent actuation of the actuator is detected within a dwell period of an initial actuation of the actuator in a majority of instances of an initial actuation.

In some examples, the memory may further store instructions that cause the at least one processor to detect a third actuation of the actuator, determine if the third actuation was detected within a dwell period of the first actuation or the second actuation of the actuator, and transmit, based on determining that the third actuation was detected within the dwell period of the first actuation or the second actuation, the first data packet on a third channel.

In some examples, the memory may further store a channel order and instructions that cause the at least one processor to transmit the first data packet on the first channel in response to the first actuation before transmitting the first data packet on the second channel in response to the second actuation, and to transmit the first data packet on the second channel in response to the second actuation before transmitting the first data packet on the third channel in response to the third actuation, based on the channel order indicating the first channel is superior to the second channel and the second channel is superior to the third channel.

In some examples, the first data packet may include a first code segment. The memory may further store instructions that cause the at least one processor to generate a second code segment using a rolling code algorithm and insert the second code segment into a second data packet configured to initiate actuation of the barrier operator and transmit, if the second actuation was detected beyond the dwell period of the first actuation, the second data packet on the first channel.

Consistent with some examples, a wireless transmitter for controlling a barrier operator may include at least one processor, an actuator, an oscillator configured to generate a carrier wave, and a memory storing instructions. When executed by the at least one processor, the instructions may cause the at least one processor to manipulate a frequency of the carrier wave to sweep across a frequency band and transmit a first data packet configured to initiate actuation of the barrier operator on the carrier wave while the carrier wave sweeps across the frequency band.

In some examples, a sweep speed and data transmission rate of the wireless transmitter may be configured such that the entire first data packet is transmitted while the carrier wave is within a tolerance bandwidth of a channel on which the barrier operator is configured to receive the first data packet. The transmitting the first data packet while the carrier wave sweeps across the frequency band may include sequentially transmitting a plurality of instances of the first data packet. The carrier wave may sweep from a starting frequency to a terminal frequency during the transmitting a plurality of instances of the first data packet. The memory may further store instructions that cause the at least one processor to transmit the first data packet in response to a first actuation of the actuator and, in response to a second actuation of the actuator, to manipulate the frequency of the carrier wave to sweep across the frequency band from the starting frequency to the terminal frequency and transmit a second data packet configured to initiate actuation of the barrier operator on the carrier wave while the carrier wave sweeps across the frequency band. The second data packet may include a rolling code segment that is different than a rolling code segment of the first data packet.

Consistent with some examples, a wireless transmitter for controlling a barrier operator may include at least one processor, an actuator, and a memory storing instructions. When executed by the at least one processor, the instructions may cause the at least one processor to operate in a first channel mode in which data packets configured to initiate actuation of the barrier operator are transmitted on a first channel, detect an extended actuation of the actuator and, in response to the extended actuation, operate in a second channel mode in which data packets configured to initiate actuation of the barrier operator are transmitted on a second channel.

In some examples, a wireless transmitter may further include a visual indicator, such as a light (e.g., an LED). The memory may further store instructions that cause the at least one processor to initiate activation of the indicator (e.g., light) to provide a visual indication to a user that the wireless transmitter has transitioned from the first channel mode to the second channel mode. Additionally or alternatively, a wireless transmitter may include a speaker and the memory may further store instructions that cause the at least one processor to initiate activation of the speaker to provide an audible indication to a user that the wireless transmitter has transitioned from the first channel mode to the second channel mode.

In some examples, the memory may further store instructions that cause the at least one processor to initiate transmission of a signal to the barrier operator. The signal may trigger the barrier operator to provide a visual or audible indication to a user that the wireless transmitter has transitioned from the first channel mode to the second channel mode.

Consistent with some examples, a wireless transmitter for controlling a barrier operator may include at least one processor, an accelerometer, an actuator, and a memory storing instructions. When executed by the at least one processor, the instructions may cause the at least one processor to transmit a first data packet configured to initiate actuation of the barrier operator on a first channel in response to actuation of the actuator, detect, using the accelerometer, movement of the wireless transmitter, and transmit the first data packet on a second channel in response to detecting the movement of the wireless transmitter.

Consistent with some examples, a wireless transmitter for controlling a barrier operator may include a battery, a sensor configured to monitor a voltage of the battery, at least one processor, an actuator, and a memory storing instructions. When executed by the at least one processor, the instructions may cause the at least one processor to transmit a first data packet configured to initiate actuation of the barrier operator on a first channel in response to actuation of the actuator, detect a change in the voltage of the battery, and transmit the first data packet on a second channel in response to detecting the change in the voltage of the battery.

Consistent with some examples, a wireless transmitter for controlling a barrier operator may include at least one processor, an actuator, and a memory storing instructions. When executed by the at least one processor, the instructions may cause the at least one processor to transmit a first data packet configured to initiate actuation of the barrier operator on a first channel in response to a first actuation of the actuator and transmit the first data packet on a second channel in response to a second actuation of the actuator.

Consistent with some examples, a barrier operating system may include a barrier, a barrier operator configured to move the barrier, and a wireless transmitter according to any of the examples discussed herein. Other examples include corresponding methods, computer systems, apparatus, and computer programs recorded on one or more computer storage devices, each configured to perform the actions described.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

Figure 1:
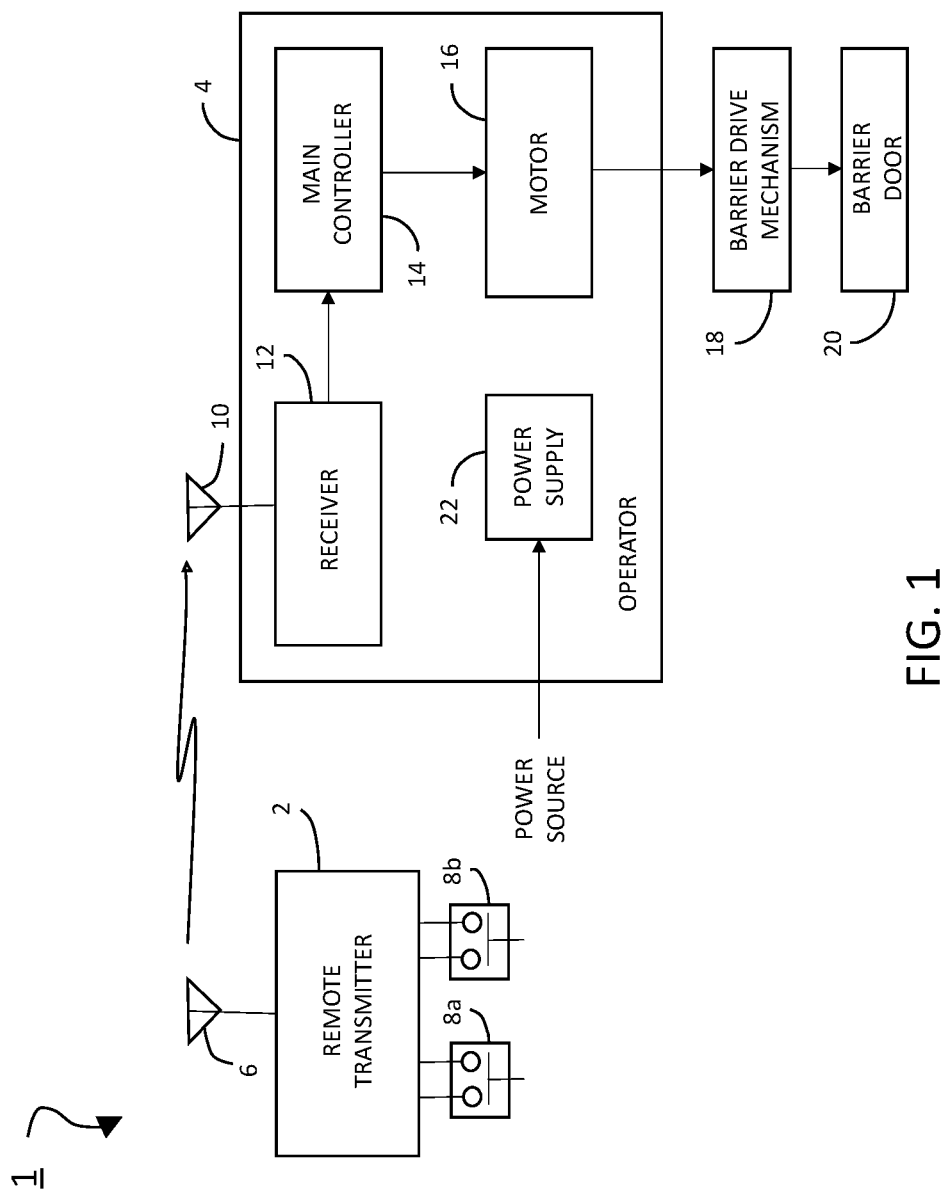
FIG. 1 is a block diagram of components of an example of a multi-channel barrier operator system in accordance with the present disclosure.

Examples of the present disclosure and their advantages are best understood by referring to the detailed description that follows. It should be appreciated that like reference numerals are used to identify like elements illustrated in one or more of the figures, wherein showings therein are for purposes of illustrating examples of the present disclosure and not for purposes of limiting the same.

DETAILED DESCRIPTION

The devices and techniques disclosed in this document may be used to enhance the reliability of wireless communications in barrier operating systems. Although described primarily in the context of movable barrier operating systems, it should be appreciated that the concepts of this disclosure may be applied in other fields of encoded wireless signal transmission.

In the following description, like elements are marked throughout the specification and drawings with similar reference numerals. The drawing figures are not necessarily drawn to scale and certain elements are shown in generalized or schematic form in the interest of clarity and conciseness. It should be understood that the embodiments of the disclosure herein described are merely illustrative of the principles of the invention.

The following description contemplates a barrier operator system utilizing a wireless communication protocol which includes the transmission of packetized coded information, such as a multibit rolling code, by multiple transmission frequencies. Some examples contemplate sending two or more redundant data packets prior to or while changing frequencies. It should be appreciated that the term "multi-channel" as used herein refers to use of two or more frequencies for transmission of one or more data packets. In some examples, a packetized message is transmitted at a first intended frequency (or channel) and then is transmitted at a second intended frequency. The term "intended frequency" in this regard, refers to a selected frequency although it will be understood that transmitters and receivers may not always operate at the exact frequency intended but will be within a bandwidth thereof. In other examples, a packetized message is transmitted while intentionally sweeping through a range of frequencies such that a packet is transmitted while the transmitter sweeps across frequencies within a particular channel. In this regard, the term "multi-channel transmitter" encompasses any transmitter that is configured to operate at more than one particular channel or frequency and distinguishes from a transmitter configured to operate at one frequency although the actual transmission frequency thereof may vary slightly higher or slightly lower. An example of a multi-channel transmitter and associated barrier operator system is described in U.S. Pat. No. 8,970,345 (entitled "Channel-Switching Remote Controlled Barrier Opening System") which is incorporated herein by reference in its entirety for all purposes.

In accordance with the present disclosure, a receiver may be configured to operate on a plurality of channels and may scan each channel for incoming transmissions from a transmitter. The rate at which the receiver switching between channels may be faster than a rate at which a transmitter changes from one channel to the next channel while transmitting redundant packets on each channel. This configuration may ensure that the receiver will detect and receive data packets. That is, because the receiver scan rate is asynchronous from the transmitter's channel switching, the odds of transmission failure (e.g., the packet is not successfully received) are drastically reduced.

Other features of the present disclosure include the capability of wireless transmitters described herein to be backward compatible with existing multi-channel receivers and with fixed channel receivers by implementing a suitable channel-switching regime. Wireless transmitters incorporating such capability are particularly advantageous because there are a large number of installed barrier operating systems. Replacing only a transmitter to implement the techniques of the present disclosure may be desirable and provide a cost savings to consumers as compared to replacing a transmitter and barrier operator.

The advantages of the various examples of the present disclosure are particularly beneficial in residential, commercial, and industrial applications as multi-channel protocol may improve transmission efficiency by mitigating the effects of RF interference.

With reference to FIG. 1, a barrier operator system 1 may include at least one wireless transmitter 2 and a barrier operator 4. A barrier drive mechanism 18 may be disposed between the barrier operator 4 and a barrier 20 (e.g., a door, a gate, etc.) that is operated by the barrier operator. A power supply 22 powers the components of the barrier operator 4. While FIG. 1 shows only one of each type of device typically used in a movable barrier system, it should be understood that there could be two or more of any of the devices shown in a given application. For example, it is common in both residential and industrial environments to have multiple barrier operators configured to move respective ones of multiple barriers, and each barrier operator may be operated by any one of multiple wireless (or wired) transmitters.

In a garage door operator system, for example, the wireless transmitter 2 may be any one of several distinct transmitter types, including but not limited to, a handheld remote, an integrated feature of a vehicle (e.g., HomeLink®), or an integral part of a wall module mounted in the interior of the garage or affixed to an exterior wall for keypad operation. Wireless communication systems of this nature usually transmit in the ultra high frequency (UHF) range and use low cost means of modulation like OOK, ASK, or FSK. Some existing systems are configured to operate at 310 MHz, 315 MHz, 390 MHz, or a combination thereof. However, it will be appreciated that any carrier frequency that can support a suitable transmission data rate could be used. It should also be understood that any modulation type can be used that is suitable for sending the data required for operation of the techniques described herein. The remote transmitter 2 has a radiating element or antenna 6 and one or more push buttons (or switches) 8a and 8b that the user presses to activate the wireless transmitter 2 to send a command associated with that push button. Typically, the push buttons 8a and 8b are associated with opening, closing, or stopping one or more barriers. For example, pressing button 8a may cause the barrier 20 to be moved in an opening direction and pressing button 8b may cause the barrier 20 to be moved in a closing direction. Alternatively, pressing button 8a may cause the barrier 20 to be moved in either direction and pressing button 8b may cause the barrier 20 to stop. In some examples, button 8a may be associated with operation of barrier operator 4 to control movement of barrier 20 and button 8b may be associated with operation of a different barrier operator (not shown). In this regard, a direction of movement of the barrier 20 caused by actuation of button 8a may be dependent upon a current status of the barrier 20 as monitored by the barrier operator 4. For example, if currently closed, actuation of button 8a may cause the barrier 20 to be moved toward an open position. If currently open, actuation of button 8a may cause the barrier 20 to be moved toward a closed position. If moving, actuation of button 8a may cause the barrier 20 to be stopped.

The barrier operator 4 includes an RF receiver 12, a main controller 14, and an electric motor 16 that powers the barrier 20 between open and closed positions via the barrier drive mechanism 18. In this example, packets of data including a rolling code are sent by the wireless transmitter 2 to the receiver 12 on one or more RF channels.

The contents of the transmitted data packets typically include bits of static (e.g., standard or non-changing) information such as manufacturer information like the transmitter's identification code and push button actuation information, in addition to a dynamic portion including information such as a rolling code, as discussed further below. Data packets may be continuously and repeatedly sent for as long as the user presses and holds down the respective push button 8a or 8b. Once the user releases the push button 8a or 8b, the transmission typically stops within a second or less. The next actuation of the same push button sends new data packets with the same static information but with a different rolling code portion for enhanced security by making it difficult to spoof a command. In some examples, the transmitter changes the channel of transmission of the data packets as the user holds down the push button, between successive actuations of the push button, or in response to a passive input signal, each discussed in more detail below. Depending upon a number of factors including the timing of the system, the packet length, the number of packets used to convey a complete message, and the length of the hold on the push button, not all of the RF channels may be used for transmitting with each use of the transmitter. For example, typically, transmission stops when a user recognizes that the barrier operator 4 has received the intended command sent by the transmitter 2.

The main controller 14 of the barrier operator 4, which may be provided by a microcontroller including one or more processors and a memory, monitors incoming data packets for valid commands as indicated by at least a valid rolling code as decoded by the receiver 12. The main controller 14 determines, inter alia, if and when to instruct the opening, closing, or stopping of the barrier 20. Typically, in garage door openers, the main controller 14 also monitors other devices, such as lights, wall buttons or consoles, entrapment devices, sensors, and other communication links. The main controller 14 may not control the operational characteristics of the receiver 12, as the receiver 12 may include its own microcontroller. The main controller 14 receives information from the receiver 12 related to tasks to be performed. However, it is contemplated that the barrier operator 4 may have only one microcontroller that performs the functions of a receiver 12 and main controller 14 as described herein. In some examples, barrier operator 4 may have hardwired circuitry to perform the requisite functions instead of a microcontroller.

Figure 2:
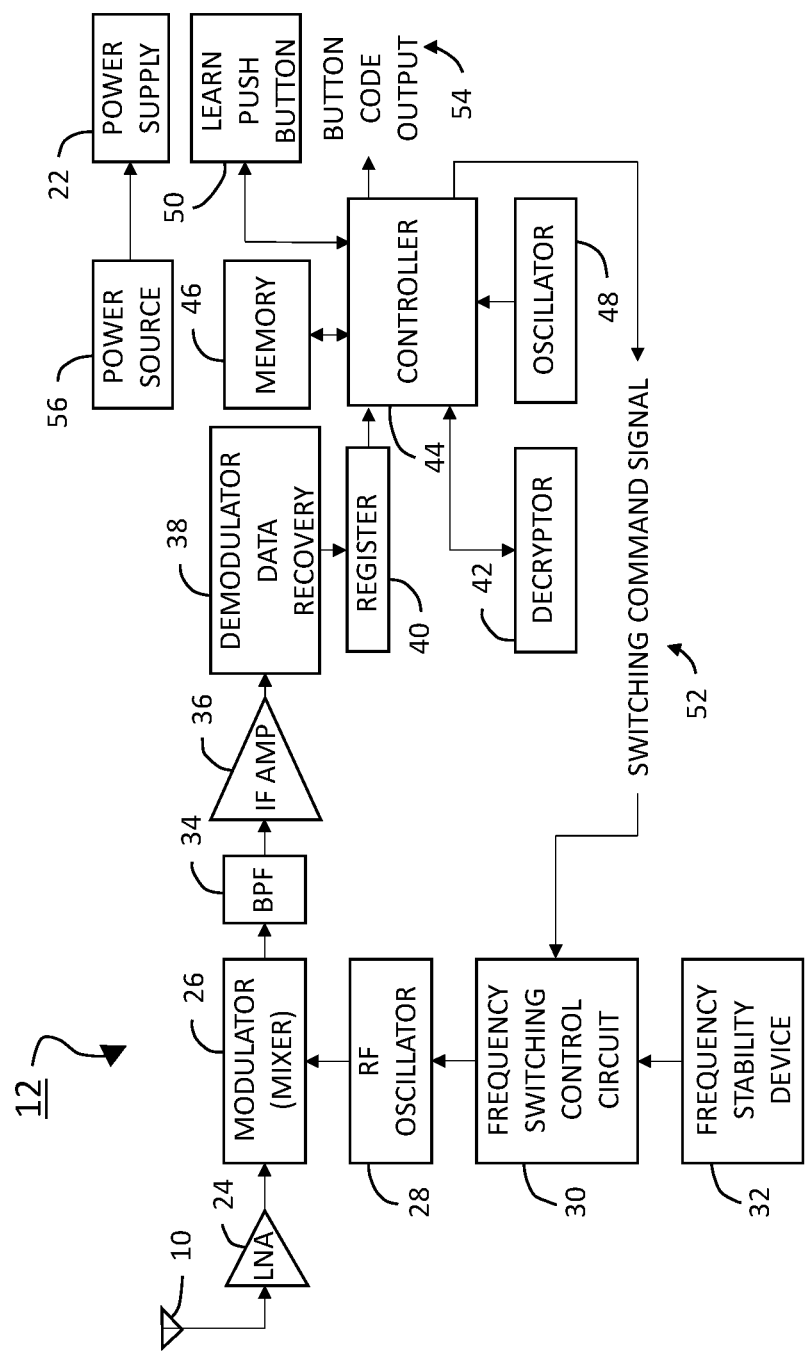
FIG. 2 is a block diagram of a receiver in accordance with the present disclosure.

An example of a receiver 12, which receives the wireless data from the wireless transmitter 2, is shown in FIG. 2. Power supply 22 of the barrier operator 4 supplies power from a power source to the various receiver components. Although there are many system architectures that could be used for receiver 12, including a single channel receiver, one multi-channel type that is contemplated is a single conversion super heterodyne type as shown in FIG. 2. In this type of receiver, a single mixer or modulator 26 is used to down convert the incoming RF signal to an intermediate frequency (IF) signal prior to amplification by the IF amplifier 36. The RF signal is picked up by the antenna 10 and amplified by the low noise amplifier 24 before entering the modulator 26. The modulator 26 requires a local RF oscillator 28 signal in order to perform the function of down conversion. RF receivers may receive signals from multiple incoming frequency channels by changing the frequency of the local RF oscillator 28 signal as the IF signal is produced by the mixing (multiplication) of the incoming RF signal and the local RF oscillator signal. A band pass filter (BPF) 34 is typically used to filter out the unwanted signals produced by the multiplication effect.

The changing of the output frequency of the local RF oscillator 28 is performed by a frequency switching control circuit 30. The frequency switching control circuit 30 may be of any suitable construction, one suitable device being an electrical circuit device known as a phase lock loop. Frequency stability of the RF oscillator may be controlled by a frequency stability device 32, which can be a crystal, a surface acoustic wave ("SAW") device, or a resonant circuit (e.g., an LC tuned circuit).

Any method for performing RF channel switching or changing at the barrier operator 4 is within the scope of this disclosure. As an example, channel switching may be accomplished by changing one or more counter values in a phase lock loop, if used. While a receiver that is capable of multi-channel operation is not required for the barrier operator system of the present disclosure, the ability to receive data communication on multiple channels may be beneficial in mitigating interference noise that may exist on any one channel. As a whole, the disclosed techniques may render wireless communications between transmitter 2 and barrier operator 4 more robust by helping ensure that the receiver 12 receives the intended packetized data by way of a channel with minimal or no interference.

With continued reference to FIG. 2, receiver 12 includes a demodulator 38 for removing the IF carrier signal and revealing the rolling code data. As the packetized data is recovered, it is shifted into shift register 40. The controller 44, through the use of the decryptor 42, oscillator 48, and memory 46, verifies that the data received is a valid command from an authorized transmitter. Once verified, the controller 44 may then forward the recovered data to the main controller 14 in the barrier operator 4 for processing (FIG. 1). The main controller 14 receives the data and generates an appropriate command for the barrier operator 4.

Figure 3:
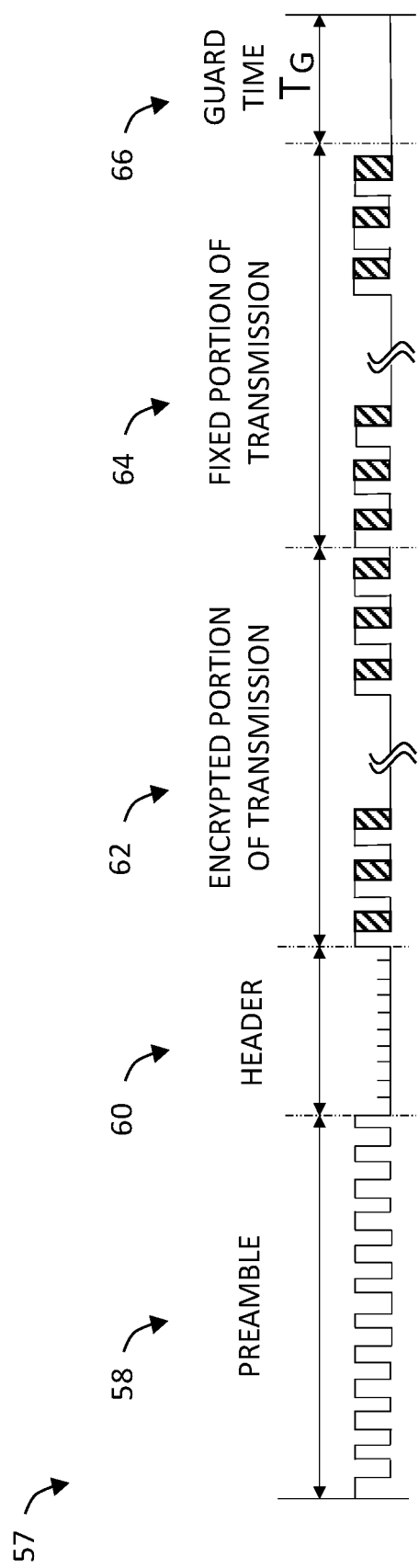
FIG. 3 is a diagram of an example of a data packet in accordance with the present disclosure.

FIG. 3 schematically illustrates an example of a structure of a rolling code data packet 57. The illustrated data packet has five different sections, namely, the preamble 58, the header 60, the encrypted portion 62 which includes the rolling code, the fixed portion 64, and the guard time portion 66. The preamble 58 typically comprises a short series of pulses used to set up a receiver's data slicers (not shown) in the demodulator 38 (FIG. 2). The header 60 is a period of time in which there are no pulses prior to the commencement of the data portion of the packet. Following the header 60 are the encrypted portion 62 and fixed (non-encrypted) portion 64. The guard time 66 is the increment of time before another packet is sent. Guard time 66 can also be described as the time between packets and may be any suitable length of time. Microchip Technology Incorporated, a corporation having its principal place of business in Chandler, Ariz., has a hopping code data format that is part of their Keeloq system that has a 66-bit payload section, with a total packet time of 100 ms and guard time is about 50 ms. Keeloq systems are usually pulse width modulated systems with bit symbol times of 600 μsec. Linx Technologies has a hopping code system called "CypherLinx," in which the data to be transmitted is combined with a 40-bit counter and 80 bits of integrity protection before being encrypted to produce a 128-bit packet with a guard time typically less than 10 ms.

Regardless of the format of the data packets, there are often similarities in one-way rolling code systems. For example, there is no error correction within a packet. This lack of error correction means that the transmitter often sends more than one redundant packet consecutively so that verification of the packet can occur at the receiver. Another similarity is that there is no exchange of security keys as may be present in two-way communication systems, like Bluetooth® and ZigBee®. Therefore, the wireless transmitter is typically paired (or "learned") while a receiver is operating in a learning mode before transmissions may be accepted by the receiver as valid.

Another characteristic of some example barrier operator systems of the present disclosure is the ratio of the scanning rate of the receiver to the potential channel switching times of the transmitter. In order for the receiver to acquire and process a transmission, the receiver scans through channels at a rate that is faster than a transmitter may remain on one channel. It is also envisioned that a receiver may only need to receive a single valid data packet out of the redundant plurality of packets on any one of the transmitter channels to process a command in response to the data packet. In this regard, it should be appreciated that the present disclosure focuses on a transmission protocol in which a single data packet includes all information needed to be received by a receiver to validate the communication and initiate a response. However, it is also contemplated and within the scope of this disclosure that a transmission protocol used between a wireless transmitter and receiver may split such needed information into two or more packets such that at least two packets must be received in order to validate the communication and initiate a response from the operator. In this regard, any illustration or description of a single packet may be considered to be a single instance of communication needed to invoke an action of a barrier operator and may, in some examples, be divided into two or more packets.

Figure 4:
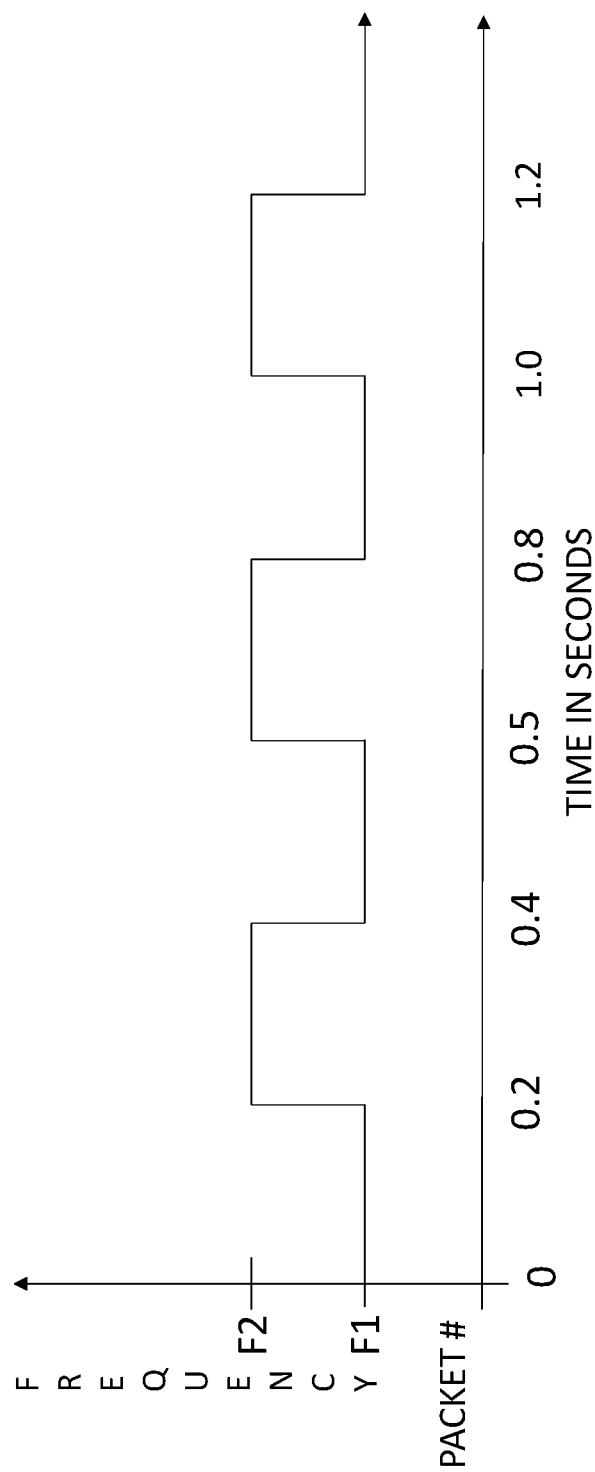
FIG. 4 is an example RF receiver timing diagram.

An example of a receiver-scanning protocol is depicted in FIG. 4. The receiver scans or switches channels between frequencies F1 and F2 relatively quickly as compared to a multi-channel transmitter which may be configured to communicate with the example receiver. FIG. 4 shows a receiver scan rate with a dwell time of 200 ms for frequency F1, followed by 200 ms of dwell time for F2, before going back to F1. The receiver may repeat this scanning rate between the two frequencies indefinitely or until it detects a data packet on one of the two channel frequencies. Although discussed herein in relation to two channels, it should be appreciated that a similar protocol may include any number of channels such as three channels or more with the receiver quickly scanning through the various channels.

In some examples, a receiver will remain on a particular channel once a data packet is sensed on that channel. For example, if the receiver identifies the beginning of a data packet, it can remain on that frequency until such time that full data packets are received and a proper decode can be made. If the receiver determines that the signal is not a valid data packet from a learned transmitter, the receiver can then revert back to its normal scanning rate. If the receiver cannot correctly read or recognize the incoming baud rate or see the appropriate time of the header, the receiver can again return back to its normal scanning rate.

Figure 5:
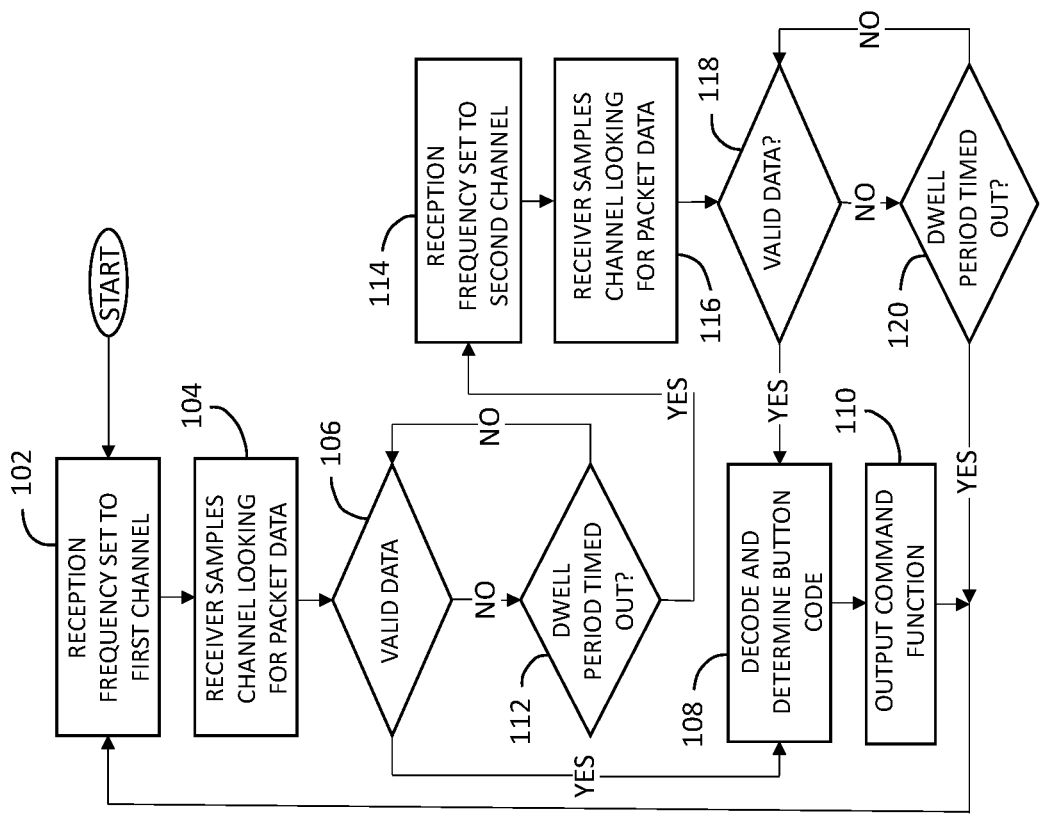
FIG. 5 is a flow chart illustrating an example method of operation of a receiver.

Turning now to FIG. 5, methods of operation for various components of a multi-channel barrier operating system are provided. The method begins with setting the reception frequency to a first channel at process 102, and the receiver samples that channel looking for packet data at process 104. If it is determined at process 106 that valid packet data has been received, then the valid packet data is decoded at process 108, a corresponding function command is output, for example to the main controller 14 at process 110, and processing returns to process 102. In some embodiments, outputting of the function command at process 110 can cause the barrier operator to initiate movement of the barrier. However, if a dwell period times out at process 112 before recognition of receipt of a valid packet, then the reception frequency is set to a second channel at process 114. Then, the receiver samples the second channel looking for valid packet data at process 116. If it is determined that a valid packet has been received at process 118, then processing proceeds to process 108. However, if another dwell period times out at process 120 before receipt of a valid packet, then processing returns to process 102.

Although the illustrated example includes two channels, it should be readily understood that additional channels can be included. Also, it should be understood that the aforementioned dwell periods are periods of time for the receiver to dwell on a channel, and that these dwell periods can be different in length or identical in length. These dwell periods can also be predetermined or dynamically determined, in some embodiments, the dwell periods can be predetermined to be long enough to increase an opportunity to receive copies of a packet but short enough to ensure the receiver is operating at a scan rate that is faster than a rate at which a transmitter would change channels to ensure that the transmitter and receiver are not operating synchronously but out of phase.

Figure 6A:
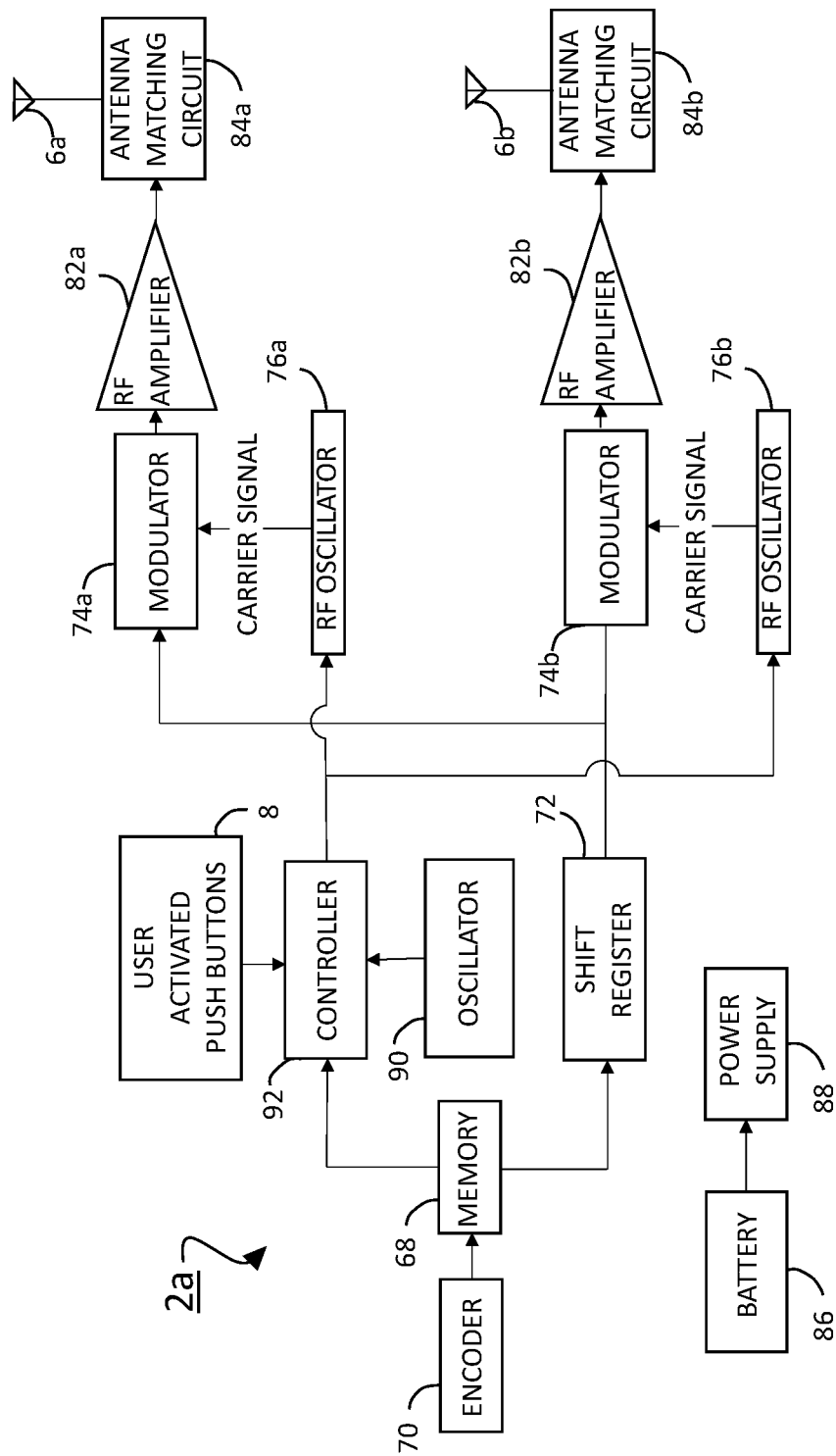
FIG. 6A is a block diagram of an example of a wireless transmitter according to the present disclosure which may be used in the multi-channel barrier operator system of FIG. 1.

An example of an RF transmitter 2a suitable for use in the barrier operating system 1 of FIG. 1 is depicted in FIG. 6A. Transmitter 2a is configured for concurrent transmission of data on two different channels in response to user actuation of one or more push buttons 8. A power supply 88 supplies power from a battery 86 to components of the transmitter 2a. The transmitter 2a has a radiating element or antenna 6a, which is connected to an RF amplifier 82a by way of a matching circuit 84a. The RF signal to be transmitted by antenna 6a is created in the modulator 74a, which performs the act of multiplying a baseband data packet (e.g., data packet 57 of FIG. 3) as generated by the controller 92 together with a carrier signal from local RF oscillator 76a. RF oscillator 76a obtains its reference from a frequency stability device (not shown) which may include a crystal, SAW device, or an LC tuned circuit.

In order to facilitate transmission of data on two channels concurrently, transmitter 2a also includes a second radiating element or antenna 6b, which is connected to an RF amplifier 82b by way of a matching circuit 84b. The RF signal to be transmitted by antenna 6b is created in the modulator 74b, which performs the act of multiplying the baseband data packet with a carrier signal from local RF oscillator 76b. RF oscillator 76b obtains its reference from a second frequency stability device.

Transmitter 2a may include an oscillator 90 to create a clock for the controller 92. The encoder 70 and the shift register 7 are utilized to properly assemble the rolling code data packets and prepare them to be modulated onto the respective carrier signals by the modulators 74a, 74b. Instructions for operating the transmitter 2a may be stored on one or more computer-readable memory devices such as memory 68.

Figure 6B:
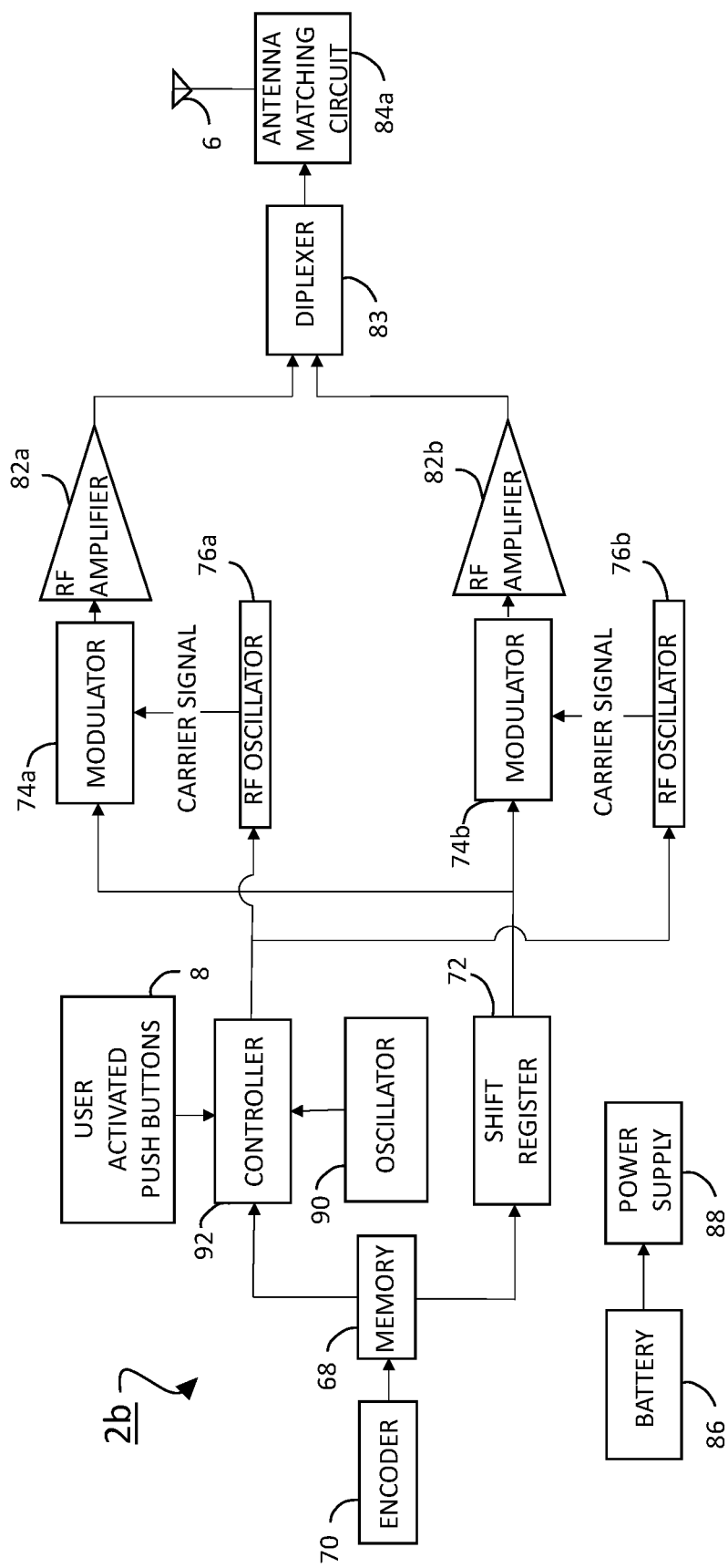
FIG. 6B is a block diagram of another example of a wireless transmitter according to the present disclosure which may be used in the multi-channel barrier operator system of FIG. 1.

FIG. 6B illustrates an example of another RF transmitter 2b suitable for use in the barrier operating system of FIG. 1. Transmitter 2b is similar to transmitter 2a but utilizes a single antenna 6 to transmit data on two channels concurrently. In this regard, the modulated signals pass from the first amplifier 82*a* and second amplifier 82*b* into a diplexer 83 which multiplexes the signals for transmission from the antenna 6.

It should be appreciated that FIGS. 6A and 6B provide illustrative examples only and a variety of additional system architectures may be used which provide the functionality of a single wireless transmitter transmitting on two or more channels at the same time. For example, the wireless transmitter 2*b* of FIG. 6B may modified to utilize a single amplifier 82 between diplexer 83 and antenna 6. Additionally, while illustrated with two modulators 74*a*, 74*b* for transmission on two channels, wireless transmitters 2*a*, 2*b* may be provided with additional modulators and associated components to facilitate concurrent transmission on any number of channels.

Figure 7:
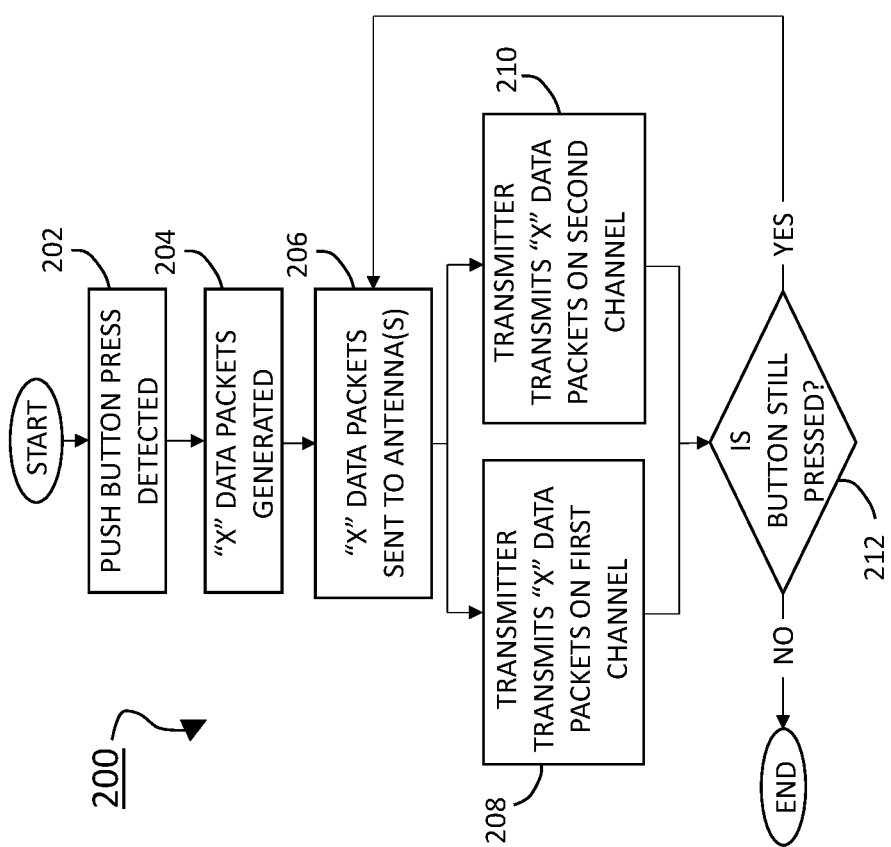
FIG. 7 is a flow chart of a method of operation of a wireless transmitter which may be implemented with the wireless transmitters of FIG. 6A or 6B.

Turning now to FIG. 7, a method of operation 200 for the wireless transmitter 2*a* or 2*b* begins at process 202 in which it is detected that the push button 8 has been pressed. In response, a number "X" of data packets are generated at process 204 and sent through the above-described components of the transmitter to the antennas (FIG. 6A) or antenna (FIG. 6B) at process 206. It should be understood that "X" could include one packet but in most examples will include a predetermined integer number of identical packets greater than or equal to two. For example, five identical packets, or five identical sets of packets needed to convey a complete message, can be generated. At process 208, the packets are transmitted on a first channel and at process 210 the packets are transmitted on a second channel. The wireless transmitters 2*a* and 2*b* are configured to execute processes 208 and 210 in a manner that is substantially concurrent, simultaneous, or otherwise overlapping such that at least a portion of a packet is being transmitted on the first channel at the same time that at least a portion of a packet is being transmitted on the second channel. Next, the transmitter determines if the push button is still pressed at process 212. If the button is still being pressed, the method loops back to process 206. Otherwise, the method 200 ends.

From the foregoing, it should be understood that in one example of the wireless transmitter 2*a* or 2*b*, five identical packets may be generated and transmitted on two channels concurrently. If the process 212 determines the button is still pressed, five more identical packets (or a different number of identical packets) may be generated and transmitted on the two channels concurrently. This process may repeat as long as the push button 8 is pressed. An illustration of this is provided in FIG. 8.

The wireless transmitter 2*a* or 2*b* may be configured to transmit on two channels labelled as frequencies F1 and F2. Each separate packet is designated in FIG. 8 with a different packet number and groups of "X" packets (five in this illustration) generated at process 204 of FIG. 7 are labelled Group A and Group B. It should be appreciated that "X" may be any suitable number in which case each Group may include the corresponding number of packets which may be more or less than five. Furthermore, each separate packet illustrated in FIG. 8 may represent a plurality of packets if a plurality of packets are required to transmit a complete message to initiate actuation of the barrier operator. In the illustrated example, each packet has a length of 100 ms on both frequencies. In other words, the wireless transmitter 2*a* or 2*b* sends five 100 ms data packets on frequency F1, and concurrently sends five 100 ms data packets on frequency F2, for a total two-channel transmission time of 0.5 seconds. The wireless transmitter 2*a* or 2*b* continues sending packets in this way until the push button 8 on the transmitter is released or until a period of predetermined transmission times out, or some combination of both. It will be appreciated that an suitable packet length may be utilized within the scope of the present disclosure. Although illustrated with each respective pair of packets (e.g., packet 1 and identical packet 2) aligned in time such that their transmission begins and ends simultaneously, it is contemplated that respective pairs of packets may be shifted in time but are considered to be concurrent so long as there is some degree of overlap within each Group such that at least one bit of a packet on F1 is transmitted simultaneously with at least one bit of a packet on F2.

Figure 8:
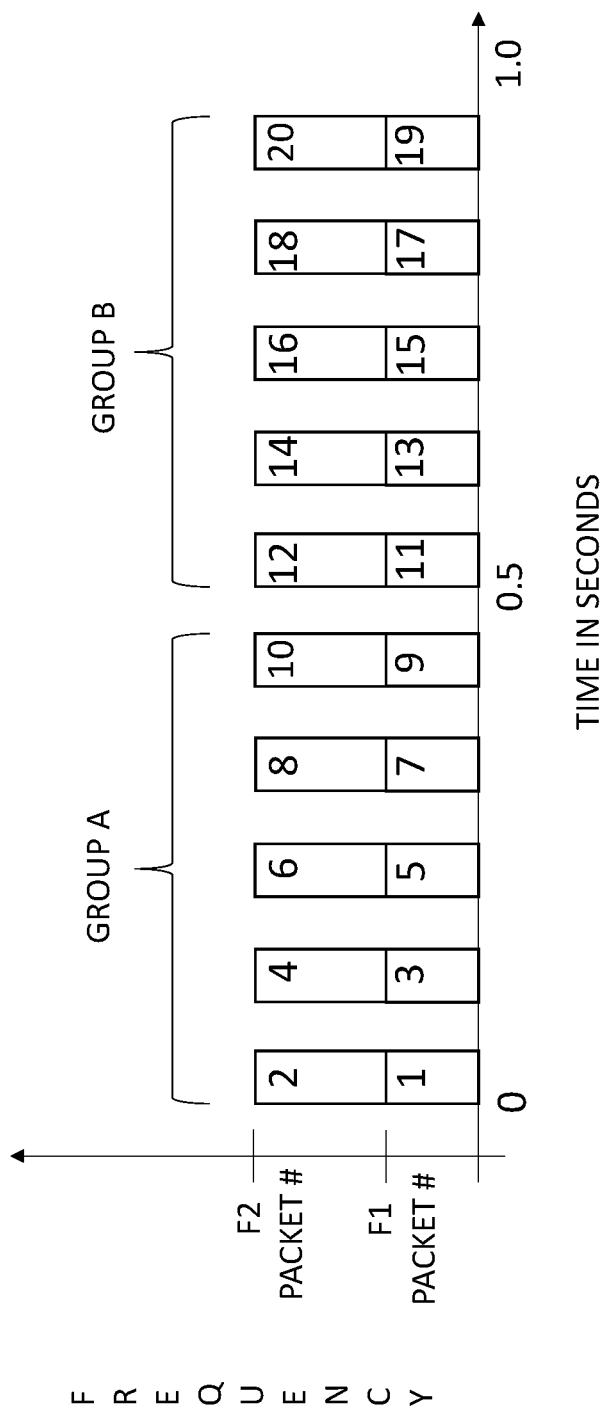
FIG. 8 illustrates an example RF transmitter timing diagram which may correspond to the method of FIG. 7.

Although the illustrated example of FIG. 8 is described as including 20 identical packets or sets of packets, it is also contemplated that the packets of Group A may each be identical, the packets of Group B may each be identical, but the packets of Group A may be different than the packets of Group B. In one example, two packets may be required to be transmitted by a wireless transmitter and received by a receiver of a barrier operator in order to invoke a response from the barrier operator. In this regard, a first packet may include a first portion of a complete message and a second packet may include a second portion of a complete message. Both portions must be successfully received at the receiver in order to complete the message and initiate an action of the barrier operator.

Similarly, it is further contemplated that the F1 packets of Group A (1, 3, 5, 7, 9) may be identical to the F2 packets of Group B (12, 14, 16, 18, 20) while the F2 packets of Group A (2, 4, 6, 8, 10) may be different than those packets but identical to the F1 packets of Group B (11, 13, 15, 17, 19), again with at least one of each packet of the set of two packets being needed to initiate an action of the barrier operator. Additionally, in some examples, a complete message may require three or more packets and the protocols described in relation to FIGS. 7 and 8 may be modified accordingly to accommodate such messages (e.g., additional packet Groups and/or additional channels).

Figure 9:
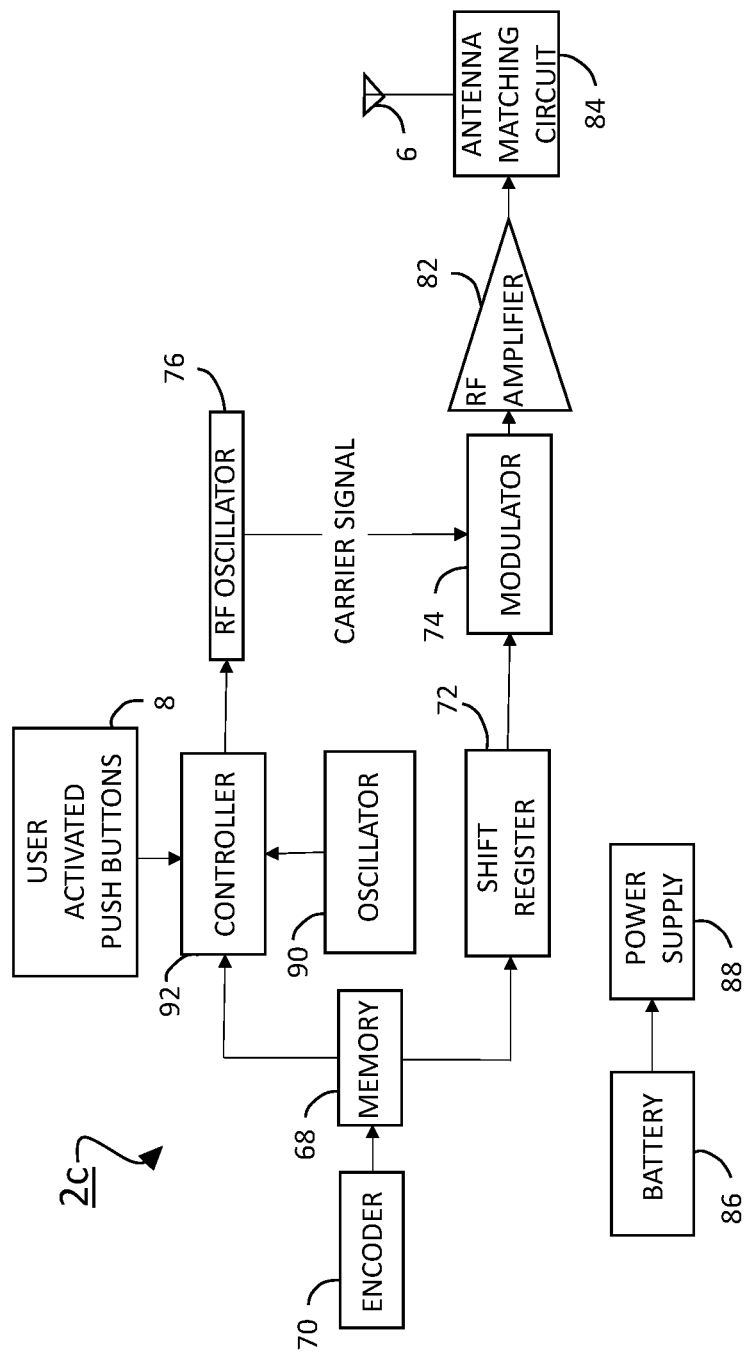
FIG. 9 is a block diagram of an example of a wireless transmitter according to the present disclosure which may be used in the multi-channel barrier operator system of FIG. 1.

Another example of an RF transmitter 2*c* suitable for use in the barrier operating system 1 of FIG. 1 is depicted in FIG. 9. Transmitter 2*c* is configured for transmission of data on one channel at any given time in response to user actuation of one or more push buttons 8. The illustrated components of wireless transmitter 2*c* are similar to those of wireless transmitters 2*a* and 2*b* and the description of these components and their functions is not repeated only for the sake of brevity. The primary difference between wireless transmitter 2*c* and wireless transmitters 2*a*, 2*b* is the removal of the second RF oscillator 76*b*, second modulator 74*b*, second amplifier 82*a*, second antenna matching circuit 84*b*, and second antenna 6*b*.

Figure 10:
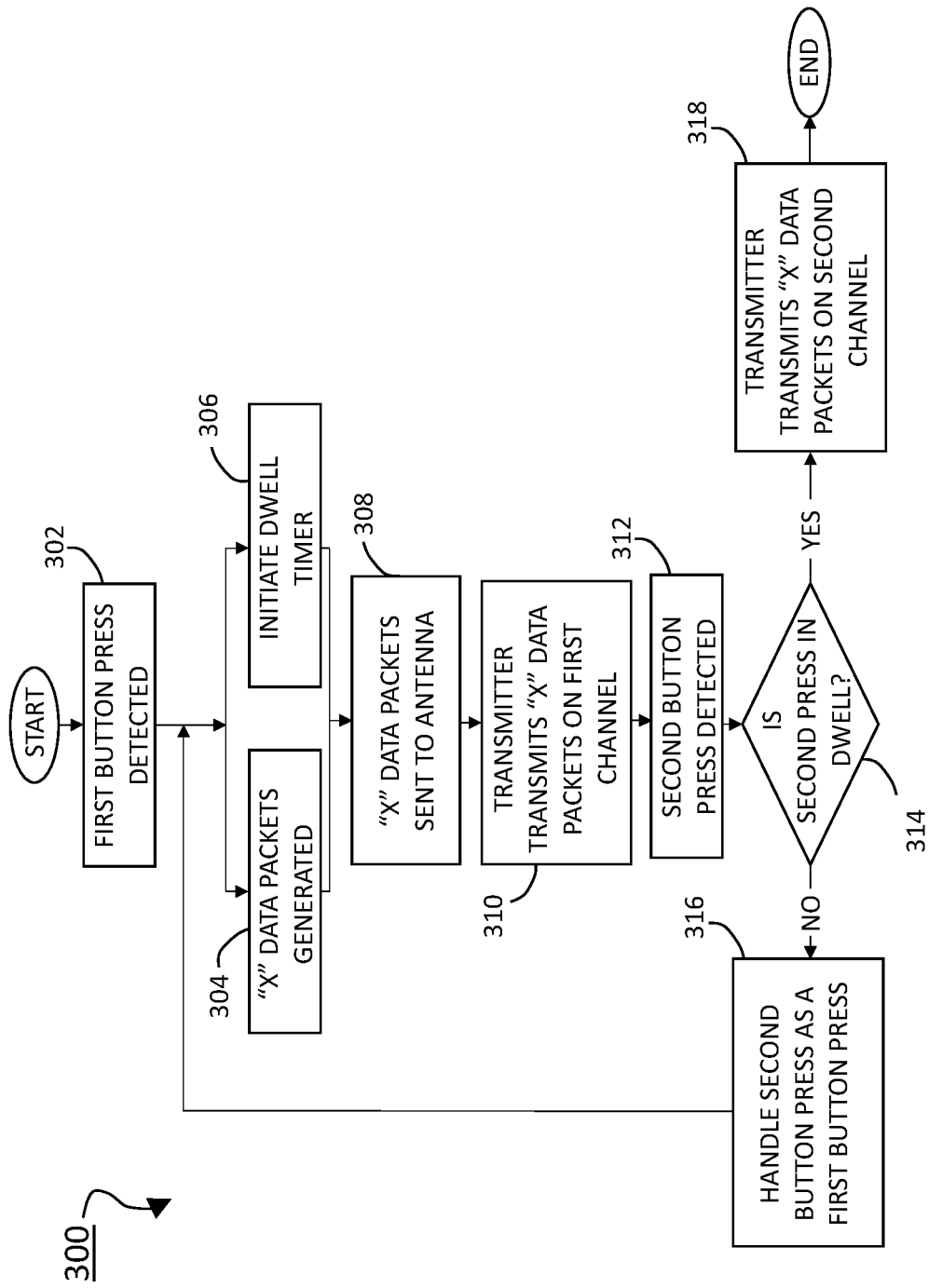
FIG. 10 is a flow chart of a method of operation of a wireless transmitter.

Turning now to FIG. 10, a method of operation 300 for the example of a wireless transmitter 2*c* is illustrated, although it should be appreciated that the method 300 may be performed on other examples of wireless transmitters such as wireless transmitters 2*a* and 2*b*. The method 300 begins at process 302 in which it is detected that a push button 8 has been pressed for a first time. In response, a number "X" of data packets are generated at process 304 and sent through the above-described components of a transmitter to the antenna 6 at process 308. It should be understood that "X" could include one packet but in most examples will include a predetermined integer number of identical packets greater than or equal to two. For example, five identical packets, or five identical sets of packets needed to convey a complete message, can be generated. As an additional response to the first button press detected at 302, at process 306, a dwell timer is initiated. It will be appreciated that the dwell timer may be initiated in response to some other event, such as the completion of generation of the packets, but the dwell timer should be initiated temporally near the time at which the first button press is detected.

At process 310, the data packets are transmitted on a first channel. It will be appreciated that at this point, the transmitter may determine if the button is still being pressed and, if so, return to process 304 and/or process 306 similar to process 212 of method 200. At process 312, a second button press of push button 8 is detected and, at process 314, it is determined whether the second button press was received within a defined dwell period as tracked by the dwell timer initiated at process 306. It should be appreciated that the dwell timer may operate as a running clock that begins at process 306 or may be conceptually embodied in a variety of other manners. For example, each button press may initiate recording of a timestamp in the memory of the wireless transmitter. Upon each button press, the current timestamp may be compared to the previous time stamp to determine whether the dwell period has elapsed.

If the second button press was not detected within the dwell period of the first button press, at process 316 it is determined to handle the second button press as a first button press and return to process 304 and/or process 306 accordingly. On the other hand, if it is determined at process 314 that the second button press was detected within the dwell period of the first button press, at process 318, the transmitter transmits the data packets on a second channel.

The dwell period may be predefined and set by the manufacturer, may be user defined, or may be dynamically adjustable accordingly to an algorithm stored in the memory of the wireless transmitter based on trends in use of the wireless transmitter. It should be appreciated that the dwell period may be sufficiently short such that detection of a second button press within the dwell period may be interpreted as an indication that the first button press was unsuccessful in invoking an action from the operator. In this regard, the second button press falling within the dwell period may indicate that the first channel is insufficient for transmission of the data packets (e.g., due to interference on that channel) such that the wireless transmitter is configured to repeat the transmission of the data packets on the second channel which may operate at a frequency unaffected by the interference on the first channel. In contrast, the dwell period may also be sufficiently long such that a second button press falling outside the dwell period may be interpreted as an indication that the first button press was successful at invoking an action of the barrier operator and the user is intending for the second button press to invoke a second action of the barrier operator. For example, a dwell period of 0.1-10 second is contemplated with a preferred dwell period being within a range of 0.5 to 1.5 seconds.

In some examples, the wireless transmitter may be statically programmed to have a primary channel and one or more secondary channels to always transmit on the first channel (primary) in response to a first button press and always transmit on a second channel (secondary) in response to a second button press within the dwell period of the first button press, and subsequently transmit on a third channel (secondary), fourth channel, etc. in response to an additional button press within the dwell period of the first button press or within a dwell period of a button press subsequent to the first button press. In this regard, it is contemplated that the timing of all subsequent button presses may be compared to the dwell period of the first button press. In some examples, the dwell period of the first button press remains static regardless of the number of subsequent button presses. In some examples, the dwell period of the first button press may be extended upon receipt of a subsequent button press. For example, the dwell period of the first button press may initially be set to 1.0 seconds. Upon detecting a second button press, that dwell period of the first button press may be extended to, for example, 1.5 seconds or 2.5 seconds. Alternatively or additionally, each subsequent button press may be associated with its own dwell period such that a second button press within the first dwell period of the first button press terminates the first dwell period and initiates a second dwell period of the second button press, which may be the same length of time or a different length of time than the first dwell period, for consideration of a third button press.

In some examples, the wireless transmitter may be programmed such that the order in which the channels are used is dynamic based on a use history. For example, the wireless transmitter may store a channel order (e.g., a list, a table, etc.) that indicates which channel is primary and which channels are secondary. The channel order may be referenced upon button press to determined which channel should be used for transmission. Further, the wireless transmitter may be configured to modify the channel order to replace the primary channel with a secondary channel when a use history of the wireless transmitter indicates problems with the primary channel. That is, the use history may indicate that the second channel in the channel order is superior (e.g., likely to have less interference) to the first channel and the channel order may be revised to list the second channel first and the first channel second such that subsequent use of the wireless transmitter will result in the second channel being the primary channel and the first channel being a secondary channel.

The use history used for modifying the channel order may be based on determining that a second actuation was detected within a dwell period of a first actuation one time or may be based on a trend or pattern over time. For example, the previous ten "first" button presses (that is a button press that is outside the dwell period of another button press) may be referenced to determine how many first button presses were accompanied by a "second" button press (that is a button press that is inside the dwell period of the first button press). The number of second button presses may be compared to a threshold value to determine whether the channel order should be modified. Although any threshold value may be used, generally it will be desirable for the threshold value to indicate 51% or more of the first button presses were accompanied by second button presses.

Figure 11A:
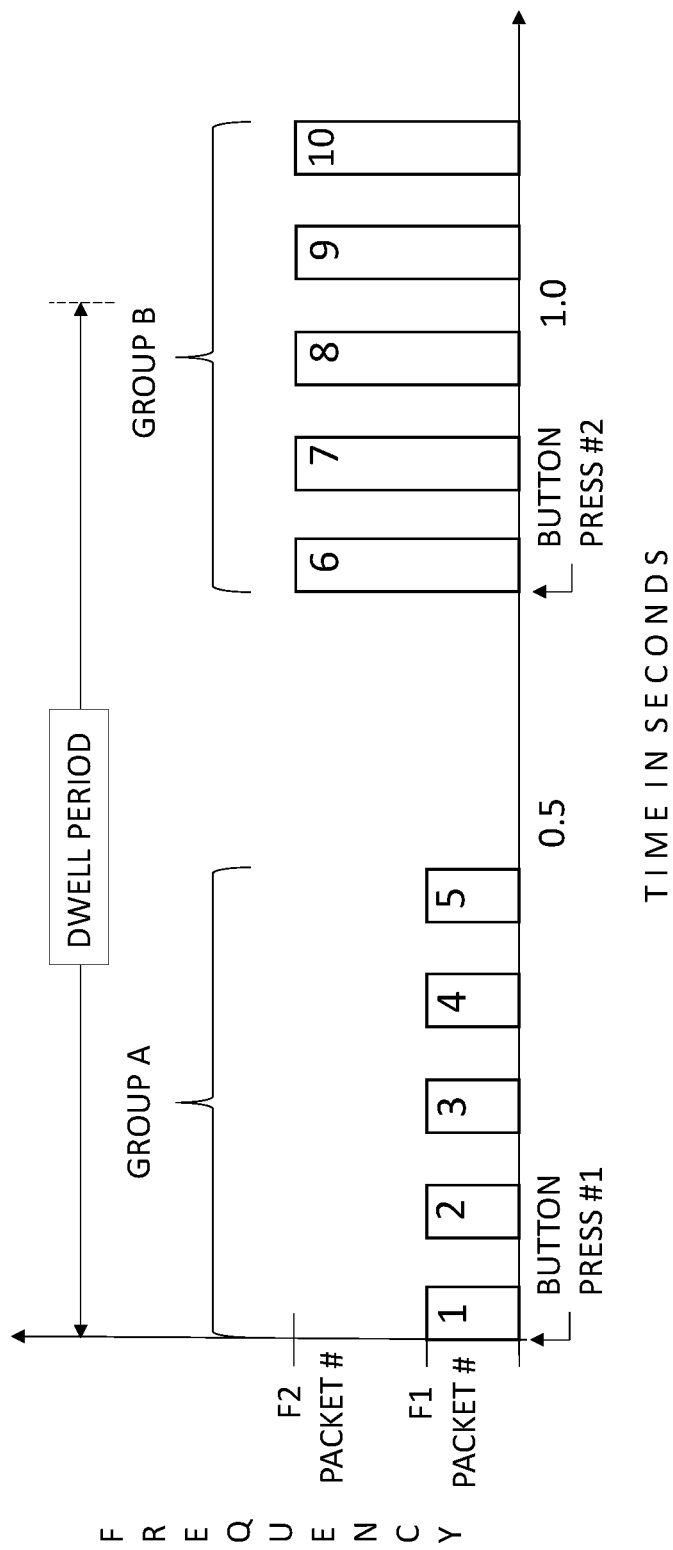
FIG. 11A illustrates an example RF transmitter timing diagram which may correspond to the method of FIG. 10.
Figure 11B:
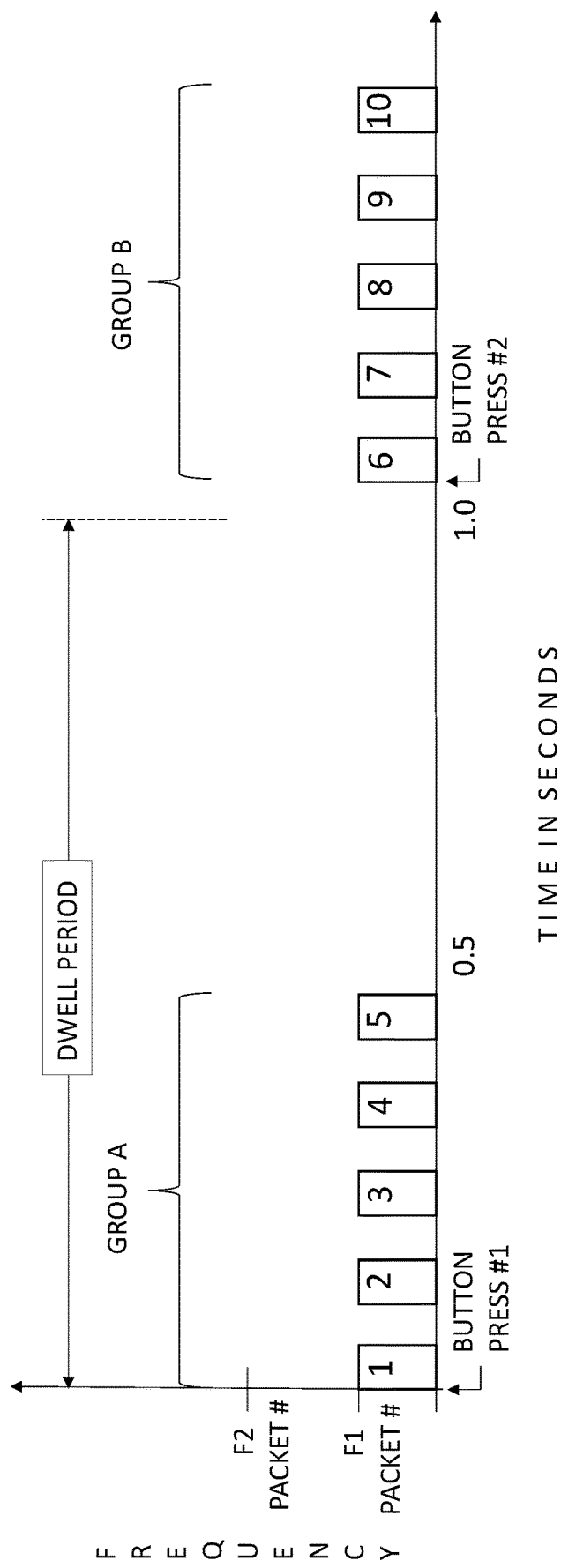
FIG. 11B illustrates another example RF transmitter timing diagram which may correspond to the method of FIG. 10.

FIGS. 11A and 11B illustrate two different example use cases of the method 300. In FIG. 11A, the Group A packets are transmitted on the first channel F1 in response to a first button press as described in relation to process 310. A second button press is then detected that falls within the dwell period of the first button press, which is set to 1 second in the illustrated example. Because the second button press is within the dwell period of the first button press, the Group B packets are transmitted on the second channel F2.

In contrast, in FIG. 11B, the second button press is detected outside of the dwell period of the first button press. Accordingly, there is no change in channel and the second button press is treated as a first button press and the Group B packets are transmitted on the first channel F1. In FIG. 11B, the Group B packets will preferably contain a different rolling code than the Group A packets. In FIG. 11A, the Group B packets may contain the same rolling code as the Group A packets or may contain a different rolling code than the Group A packets.

As with all of the illustrated examples herein, any number of redundant packets may be transmitted in each Group (e.g., one or twenty) and further a complete message may require two or more packets such that the separate packets illustrated may represent a complete message including two or more packets.

Figure 12:
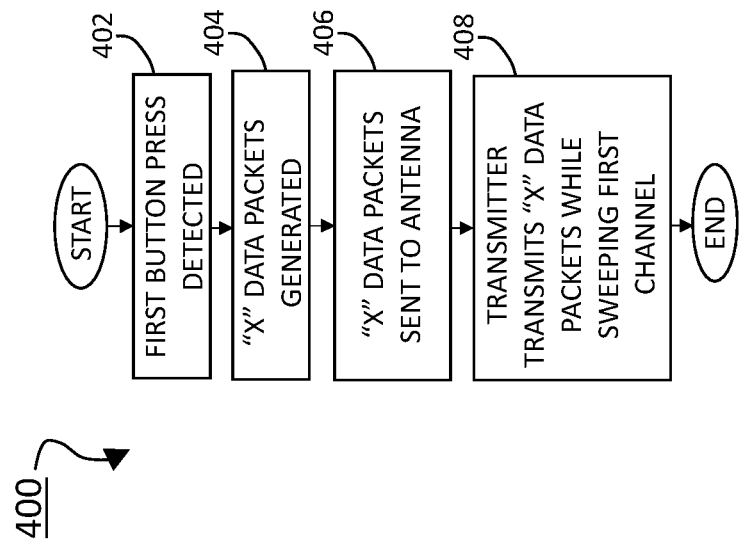
FIG. 12 is a flow chart of a method of operation of a wireless transmitter.

Turning now to FIG. 12, another method of operation 400 for the example of a wireless transmitter 2c is illustrated, although it should be appreciated that the method 400 may be performed on other examples of wireless transmitters such as wireless transmitters 2a and 2b. The method 400 begins at process 402 in which it is detected that a push button 8 has been pressed for a first time. In response, a number "X" of data packets are generated at process 404 and sent through the above-described components of a transmitter to the antenna 6 at process 406. It should be understood that "X" could include one packet but in most examples will include a predetermined integer number of identical packets greater than or equal to two. For example, five identical packets, or five identical sets of packets needed to convey a complete message, can be generated.

At process 410, the data packets are transmitted while the transmitter sweeps across a band of frequencies. That is, as the transmission of the "X" data packets is occurring, the RF oscillator 76 may smoothly increase or decrease the frequency of the carrier signal. In this regard, portions of each packet will be transmitted at different frequencies of the same packet, but may be within a tolerance of a bandwidth of a receiver. For example, a receiver may be configured to operate at 315 MHz or may be configured to switch back and forth between 315 MHz and 390 MHz (see, e.g., FIG. 4). In practice, such a receiver rarely if ever operates steadily at the intended or desired frequency. Rather, when operating at 315 MHz, the receiver may vary, for example, between 314.8 MHz and 315.2 MHz or even between 313 MHz and 317 MHz. In this regard, a wireless transmitter may be programmed to intentionally sweep across a frequency band corresponding to a bandwidth of a receiver. For example, a transmitter suited for operation with a receiver that always or sometimes operates on the 315 MHz channel and has a ±0.2 MHz tolerance may be configured to begin transmitting the data packets at 314.8 MHz (or 314.7 MHz or 314.9 MHz) and sweep across the frequency band to 315.2 MHz (or 315.3 MHz or 315.1 MHz). Any suitable sweep speed (rate at which the carrier frequency changes) may be used, with each data packet being transmitted at a different frequency than the packet before it, yet at least two packets are still being transmitted within the tolerance band of the receiver. In one example, a sweep speed may be selected such that the preamble of a first packet begins on a first frequency within the channel and the last bit of the last transmitted packet end on the last frequency within the channel with a linear slope in between. In another example, the transmitter may sweep back and forth across the channel such that the frequency of the carrier signal is increased and decreased a plurality of times even during the course of one transmission in response to a button press.

Figure 13:
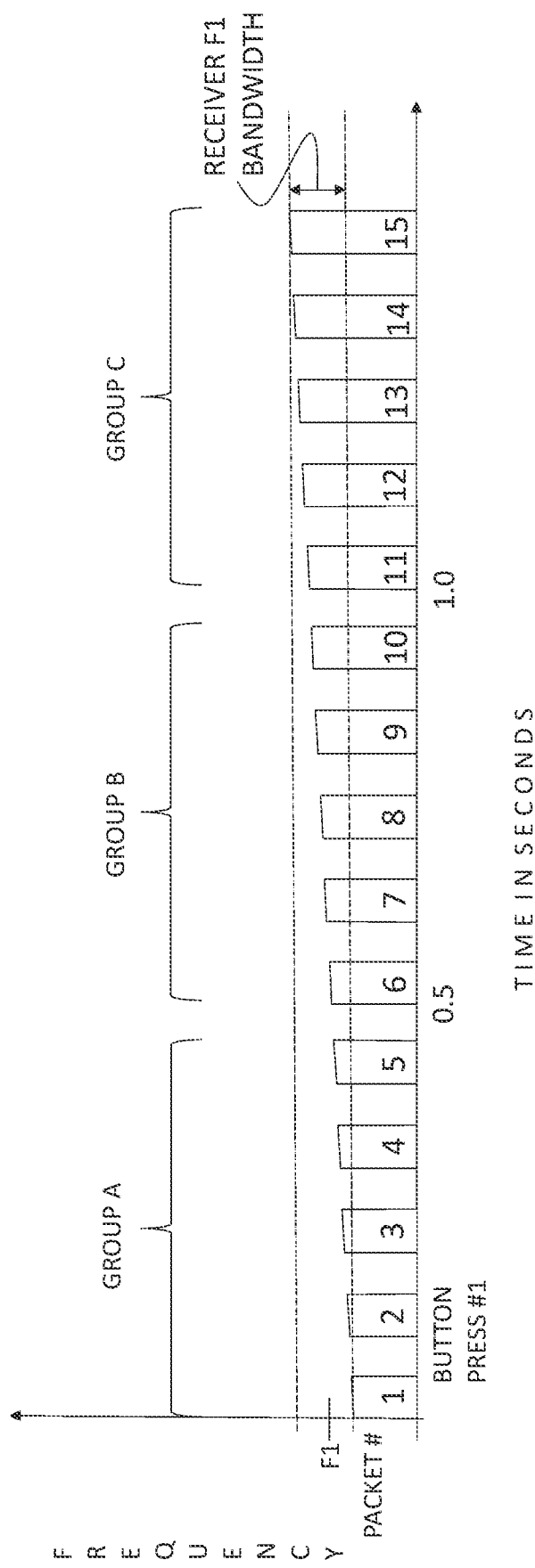
FIG. 13 illustrates another example RF transmitter timing diagram which may correspond to the method of FIG. 12.

In some examples, a wireless transmitter may be configured to sweep across a plurality of sub-bands during transmission. One such example is illustrated in FIG. 13. In this example, the transmitter may be configured to operate on channel F1. Similarly, the receiver may also be configured to operate on channel F1 but may have a bandwidth range centered around F1 (although not necessarily centered). The wireless transmitter may be configured to transmit a first packet (designated 1 in FIG. 13) beginning at time=0 in response to a first button press. A Group A of "X" packets, in this case five packets, may be transmitted as the carrier wave is swept across a first sub-band of channel F1, a Group B may be transmitted as the carrier wave continues sweeping across a second sub-band of channel F1, and a Group C may be transmitted as the carrier wave continues sweeping across a third sub-band of channel F1. In the illustrated example, the middle packet (i.e., packet 8) is centered on the desired or intended frequency of the receiver F1 (or 315.0 MHz in the example above) although such an arrangement is not necessary.

In other example, each Group of packets may begin and/or end on the same frequency as the other Groups of packets and more or fewer Groups may be used.

One advantage of the method 400 is that some interference on channel F1 may be avoided by operating in a portion of a sub-band that has minimal or no interference while another sub-band of channel F1 may be experiencing interference. In this regard, interference may be avoided without the need to fully switch channels but rather the transmitter can pseudo-channel switch within the respective frequency band of a given channel.

Figure 14:
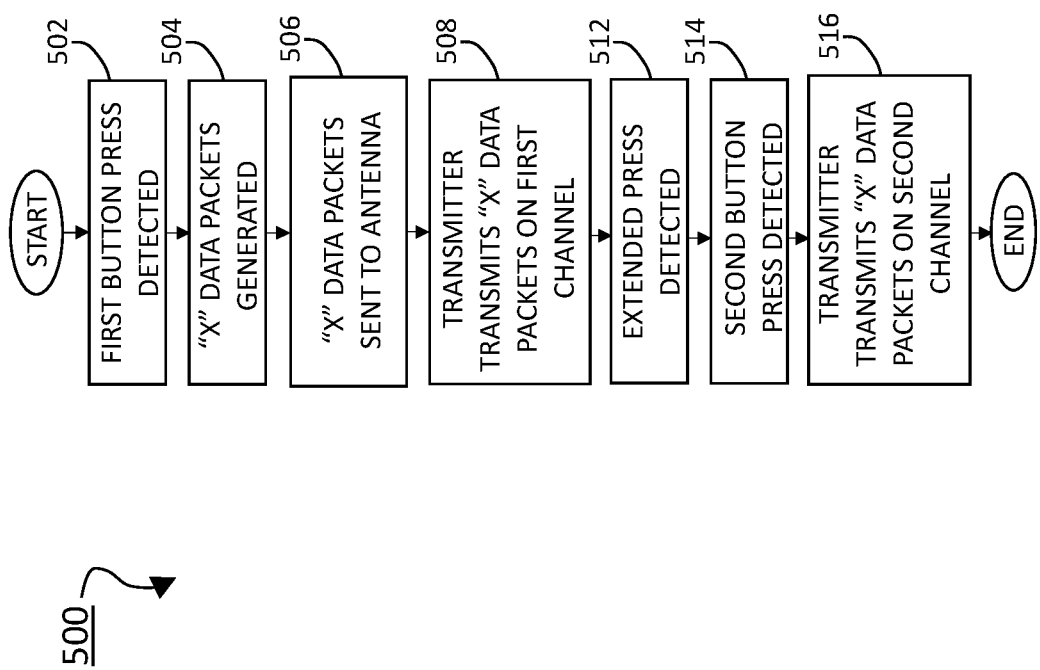
FIG. 14 is a flow chart of a method of operation of a wireless transmitter.

Turning now to FIG. 14, another method of operation 500 for the example of a wireless transmitter 2c is illustrated, although it should be appreciated that the method 500 may be performed on other examples of wireless transmitters such as wireless transmitters 2a and 2b. The method 400 begins at process 502 in which it is detected that a push button 8 has been pressed for a first time. In response, a number "X" of data packets are generated at process 504 and sent through the above-described components of the transmitter to the antenna 6 at process 506. It should be understood that "X" could include one packet but in most examples will include a predetermined integer number of identical packets greater than or equal to two. For example, five identical packets, or five identical sets of packets needed to convey a complete message, can be generated. At process 508, the data packets are transmitted on a first channel.

At process 512, an extended press of the same push button 8, and/or another push button in some examples, is detected. In the regard, an extended press may include any sustained holding of the push button in the depressed position that actuates the transmitter. A threshold period of time may be referenced by the transmitter to determine if a button hold should be considered an extended press (e.g., length of hold exceeds the threshold). In some examples, during the period of an extended button press that is below the threshold period of time may result in continued redundant transmission of the data packets as described in relation to methods above. Upon reaching the threshold (e.g., 10 seconds), the transmitter may terminate transmission on the first channel. Upon detecting the next button press at process 514, the transmitter may transmit data packets on a second channel at process 516. It will be appreciated that the packets transmitted on the second channel may have a different rolling code than the packets transmitted on the first channel such that additional processes between process 514 and process 516 may include generating new data packets and sending them to the antenna. In some examples, the same rolling code may be used in the packets of process 508 and process 516.

In this regard, the wireless transmitter used in method 500 may be configured to allow a user to reconfigure the transmitter to transmit on a different channel using a direct, non-passive action, such as by holding a push button down for a predetermined period of time. In some examples, the user may be instructed to count or time the extended press to ensure it exceeds a threshold time (e.g., hold the button for 10 seconds to switch transmission to a different channel). In some examples, a visual indicator, (e.g., an LED light, or other indicator) may blink (or turn off if activated by pressing the button) or otherwise provide a visual indication to the user that the threshold period of time has been exceeded and the transmission channel has been changed. Such an indicator (e.g., light) could be disposed in any of multiple locations, including in the wireless transmitter, disposed in the barrier operator, or a wall console. In some instances, the channel may be presented on a display on the transmitter. In instances where the indicator is on the barrier operator, a signal may be sent to the barrier operator upon a change of channels to activate the indicator (e.g., light or screen or other visual indicator). In some examples, a speaker or other sound generator may produce a noise to provide an audible indication to the user that the threshold period of time has been exceeded and the transmission channel has been changed. Such a sound generator may be disposed in the wireless transmitter or may be disposed in the barrier operator.

In some examples, upon detecting an extended button press, the wireless transmitter may enter a channel programming mode in which the user can select a channel. While in the channel programming mode, the LED may provide a distinct indication related to a currently selected channel (e.g., a number of flashes, a color emitted, etc.). The user may cycle through channels while the transmitter is in the channel programming mode by pressing the push button. While each press of the push button, the LED may provide a new indication of the currently selected channel. Upon reaching the desired channel, the user may wait for a period of time to elapse, after which the transmitter exits the channel programming mode. Alternately, the user may exit the channel programming mode by pressing the push button for an extended period of time (e.g., 10 seconds). The transmitter may provide an indication that it has exited the channel programming mode and returned to a normal operation mode via the LED. Upon exiting the channel programming mode, the transmitter may operate on the last selected channel of the channel programming mode. It will be appreciated that the LED may be replaced or supplemented with a sound generator (e.g., speaker) and audible indications (e.g., beeps or a recorded message such as "channel 2").

Figure 15:
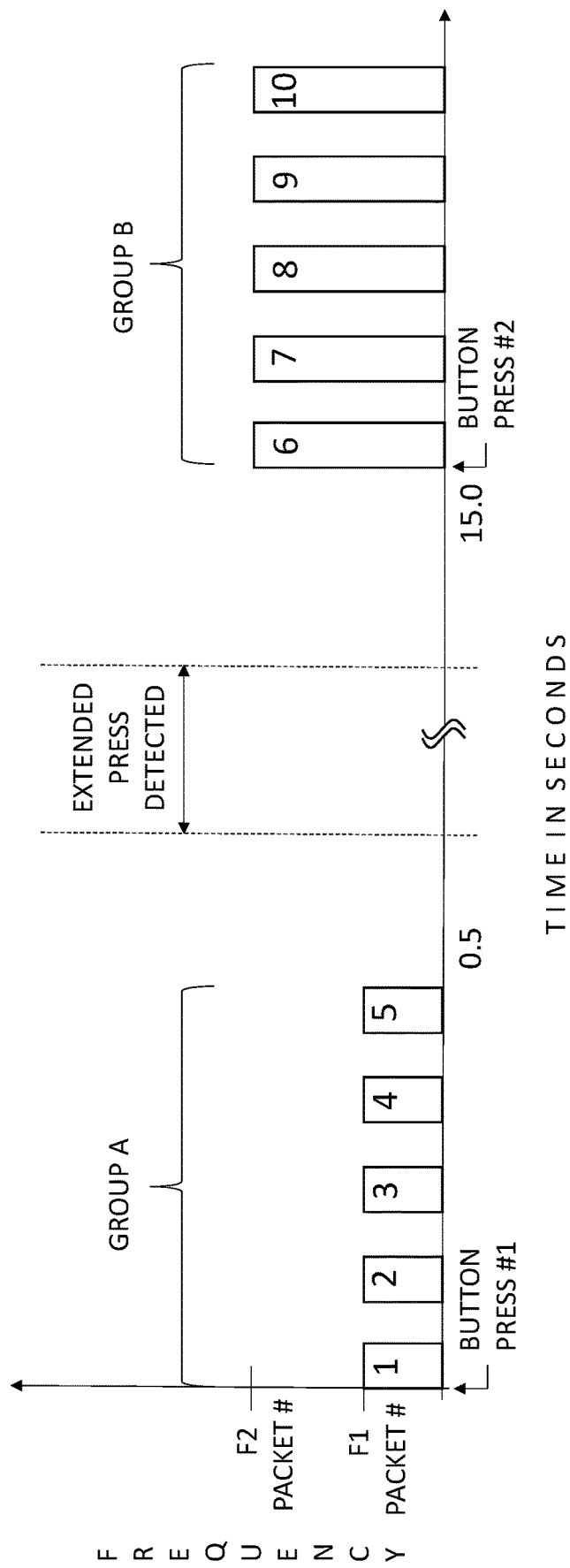
FIG. 15 illustrates another example RF transmitter timing diagram which may correspond to the method of FIG. 14.

FIG. 15 illustrates an example of a series of transmissions in accordance with method 500. In this example, the transmitter may be configured to operate on channel F1. Upon detecting a first button press, a series of redundant packets are transmitted on channel F1 in Group A. By the time a second button press is detected (at approximately time=15 s), an extended button press has since been detected. Accordingly, in response to the second button press, the Group B packets are transmitted on channel F2. In contrast, if there were no extended button press detected between the first button press and the second button press, the packets of Group B would be transmitted on channel F1 as well.

Figure 16:
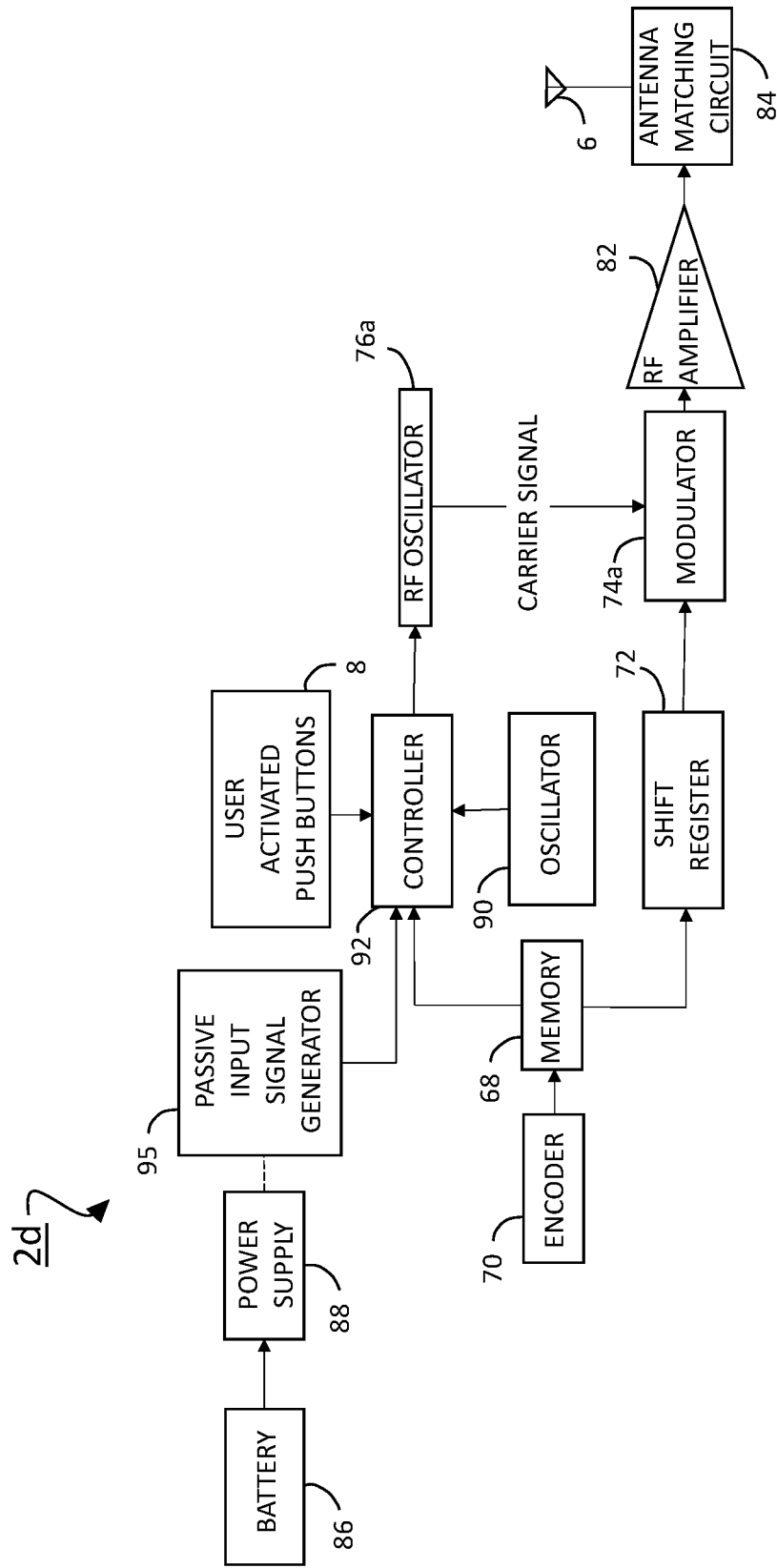
FIG. 16 is a block diagram of another example of a wireless transmitter according to the present disclosure which may be used in the multi-channel barrier operator system of FIG. 1.

Another example of an RF transmitter 2d suitable for use in the barrier operating system 1 of FIG. 1 is depicted in FIG. 16. Transmitter 2d is configured for transmission of data on one channel at any given time in response to user actuation of one or more push buttons 8. The illustrated components of wireless transmitter 2d are similar to those of wireless transmitters 2a-2c and the description of these components and their functions is not repeated only for the sake of brevity. The primary difference between wireless transmitter 2d and wireless transmitter 2c is the addition of a passive input signal generator 95. Passive input signal generator 95 may be any suitable mechanism for providing the controller 92 an input signal that triggers a change in the transmission frequency of the transmitter 2d. In this regard, the passive input signal generator may be a hardware device such as an accelerometer or tilt sensor that detects movement of the transmitter 2d or may be a software module that detects a physical or environmental change in conditions. In one example, the passive input signal generator 95 may be a physical voltage sensor or may be a module stored in the memory 68 that is executed by the controller 92 to monitor a voltage or other electrical characteristic of the battery 86. In one example, upon the voltage dipping below a threshold, the passive input signal generator 95 may output a signal to the controller 92 indicating that the output channel should be changed.

The term "passive" is used to describe the passive input signal generator 95 in that the user is not necessarily intending to make a change of transmission channel and may not even be aware of such a change. In this regard, the passive input signal generator 95 produces a signal with only indirect or "passive" action of the user (e.g., moving the wireless transmitter or actuating the button which then causes a drop in voltage unknowingly to the user) which triggers a channel switch as opposed to an intentional or direct change of channel (as would be the case if the user manually flipped a switch to change channels). That is, a passive input is a change that occurs outside of a user's awareness, but that may be directly or indirectly initiated by the user. Additionally, in some examples, a passive input signal generator 95 may be distinguished from programming of the controller which causes transmission on a first channel for a period of time or a quantity of packets and then automatically switches to another channel after the period of time has elapsed or the quantity of packets has been transmitted.

Figure 17:
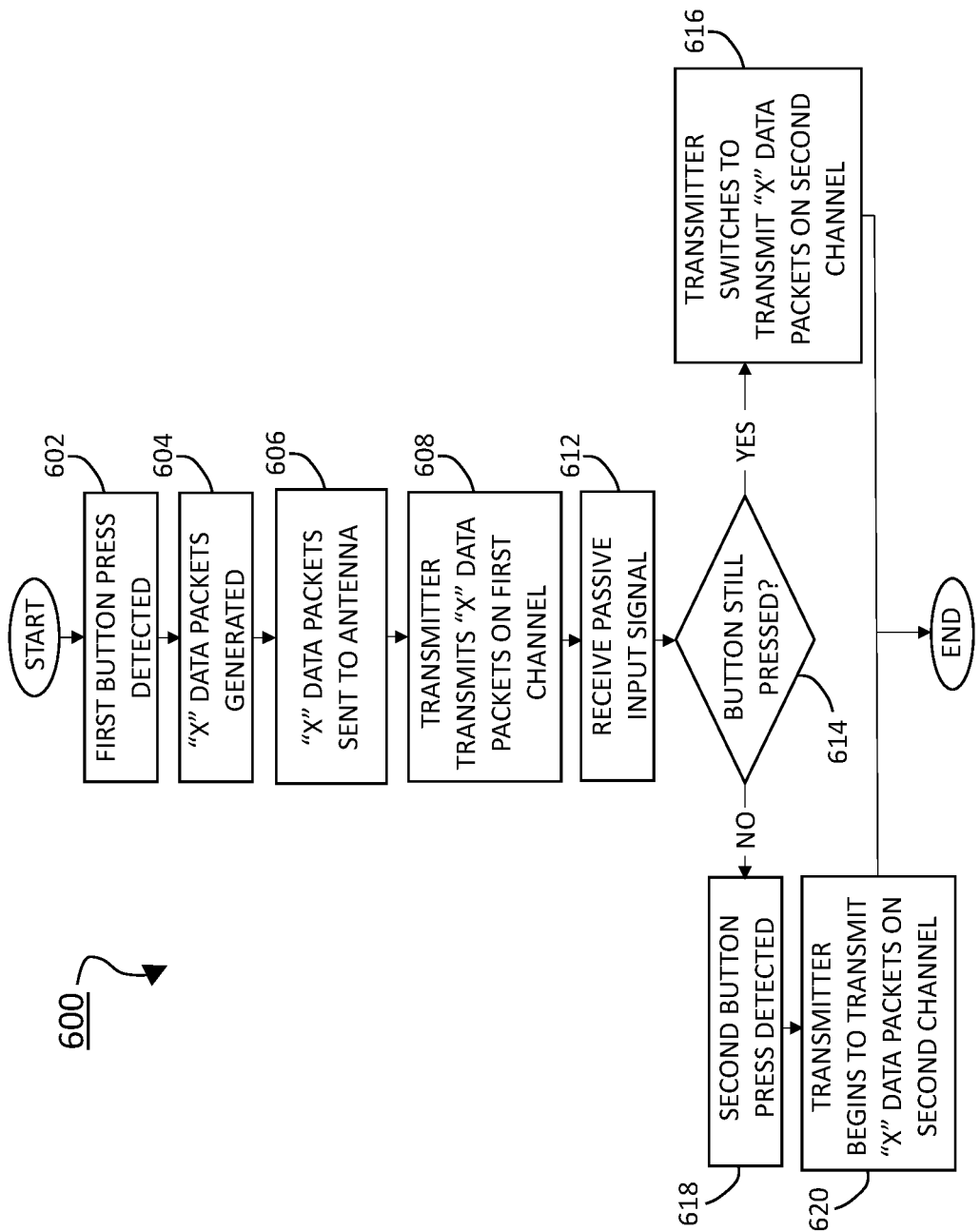
FIG. 17 is a flow chart of a method of operation of a wireless transmitter which may be implemented with the wireless transmitter of FIG. 16.

Turning now to FIG. 17, a method of operation 600 for the example of a wireless transmitter 2d is illustrated, although it should be appreciated that the method 600 may be performed on other examples of wireless transmitters such as wireless transmitters 2a, 2b, or 2c as long as they also include a passive input signal generator. The method 600 begins at process 602 in which it is detected that a push button 8 has been pressed for a first time. In response, a number "X" of data packets are generated at process 604 and sent through the above-described components of a transmitter to the antenna 6 at process 606. It should be understood that "X" could include one packet but in most examples will include a predetermined integer number of identical packets greater than or equal to two. For example, five identical packets, or five identical sets of packets needed to convey a complete message, can be generated. At process 608, the data packets are transmitted on a first channel.

At some point in time after process 602, a passive input signal is received by the controller from the passive input signal generator at process 612. A determination is made at process 614 as to whether the push button is still being held from the first button press when the passive input signal is received. If it is, the transmitter begins transmitting on a second channel at process 616 with packets that may be identical to the packets transmitted on the first channel or with a different rolling code. If the button is not being held at process 614, then the method may proceed to wait for a further button press. Upon detecting a second button press at process 618, the transmitter then initiates transmission of packets with a different rolling code at process 620.

Figure 18:
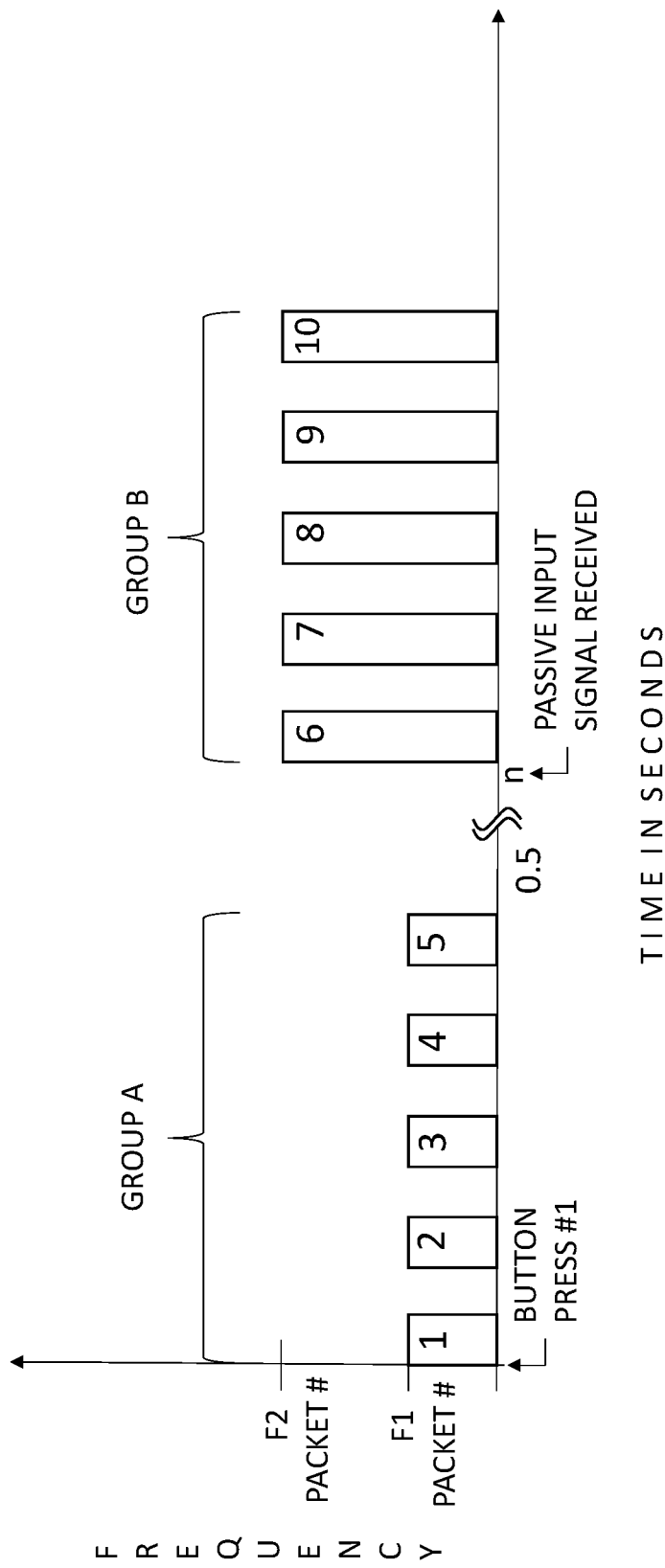
FIG. 18 illustrates another example RE transmitter timing diagram which may correspond to the method of FIG. 17.

FIG. 18 illustrates an example packet output in accordance with method 600. The Group A packets are transmitted on the first channel F1 in response to a first button press as described in relation to process 608. A passive input signal is then received at time=n which causes the transmitter to switch to channel F2 for transmission of Group B. If the push button is still being held at time=n, then the transmitter will stop transmitting on channel F1 and begin transmitting on channel F2. If the push button is not still being held from the first button press at time=n, then the transmission of Group B on channel F2 will begin upon the next (e.g., second) detected button press.

Figure 19:
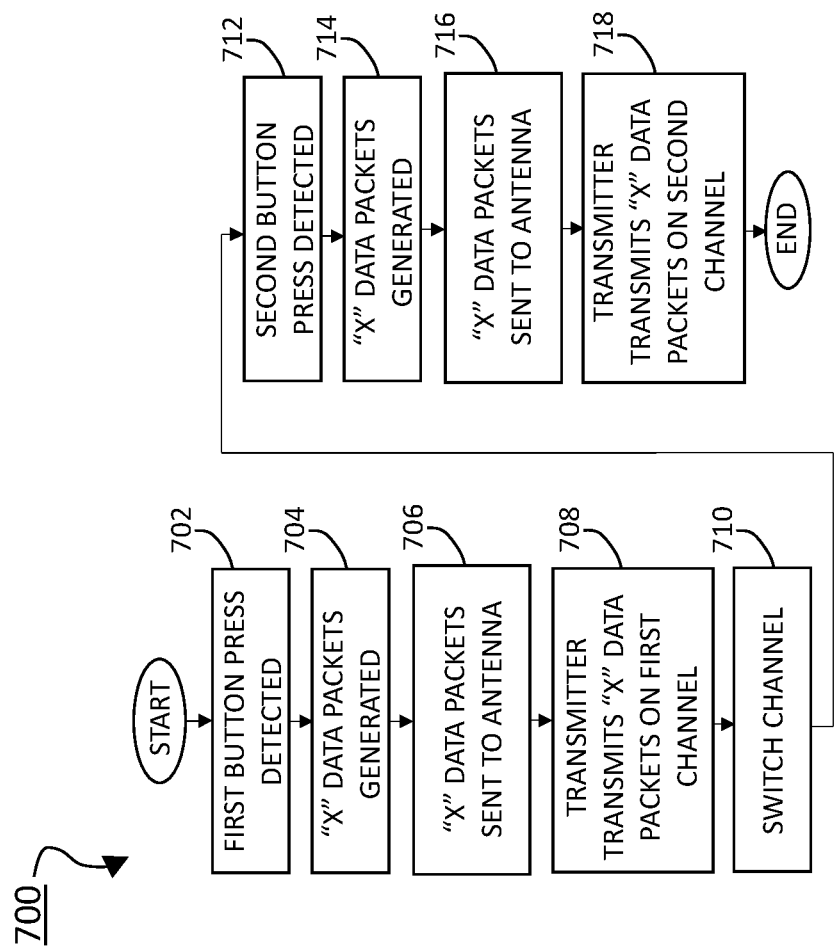
FIG. 19 is a flow chart of a method of operation of a wireless transmitter.

Turning now to FIG. 19, a method of operation 700 for any example of a multi-channel wireless transmitter 2a-2d is illustrated. The method 700 begins at process 702 in which it is detected that a push button 8 has been pressed for a first time. In response, a number "X" of data packets are generated at process 704 and sent through the above-described components of a transmitter to the antenna 6 at process 706. It should be understood that "X" could include one packet but in most examples will include a predetermined integer number of identical packets greater than or equal to two. For example, five identical packets, or five identical sets of packets needed to convey a complete message, can be generated. At process 708, the data packets are transmitted on a first channel.

Then at process 710, the transmitter switches channels. This channel switch may in response to any factor or input which indicates to the controller that a channel switch should be initiated. Then, at process 712, a second button press is detected. In response, a number "X" of data packets are generated at process 714 and sent through the above-described components of a transmitter to the antenna 6 at process 716. It should be understood that "X" could include one packet but in most examples will include a predetermined integer number of identical packets greater than or equal to two. For example, five identical packets, or five identical sets of packets needed to convey a complete message, can be generated. At process 718, the data packets are transmitted on a second channel. In this regard, method 700 contemplates a first button press causing transmission on a first channel and a second button press causing transmission on a second channel.

Figure 20:
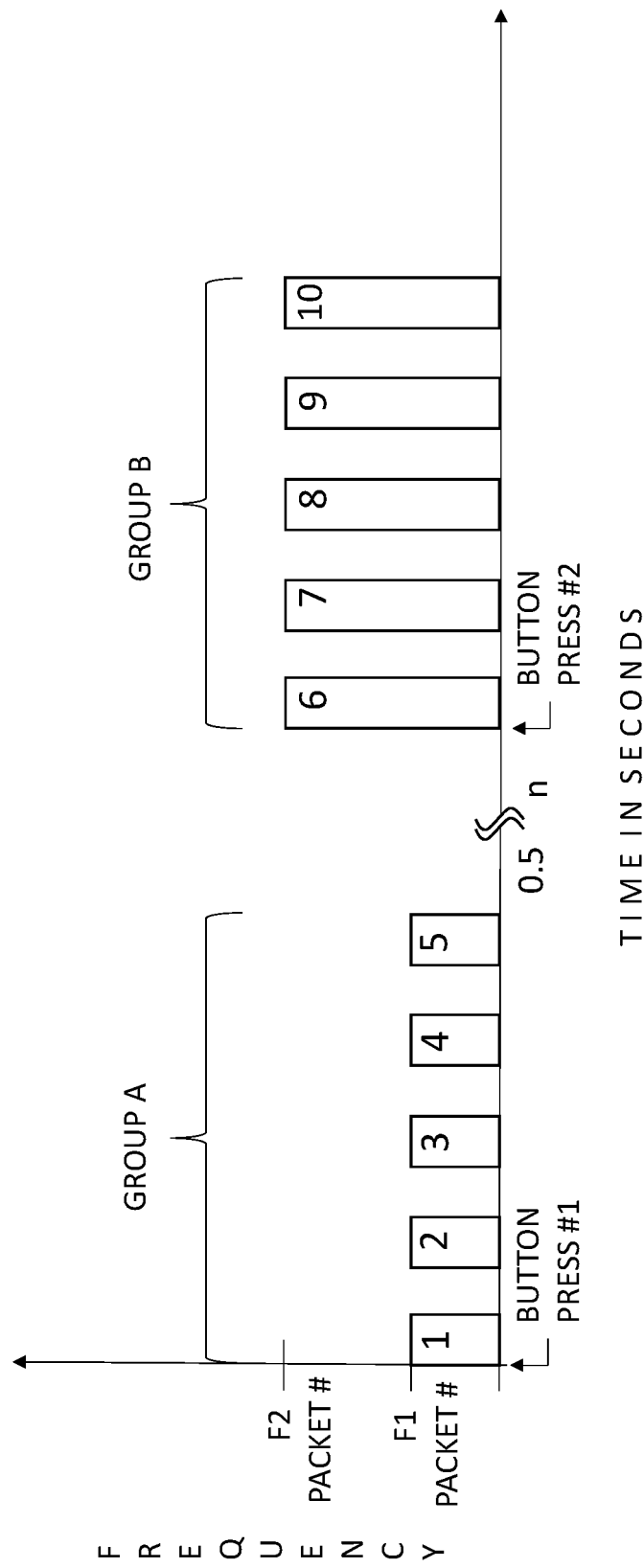
FIG. 20 illustrates another example RF transmitter timing diagram which may correspond to the method of FIG. 19.

FIG. 20 illustrates an example packet output in accordance with method 700. The Group A packets are transmitted on the first channel F1 in response to a first button press as described in relation to process 708. At some later point in time, a second button press is detected and the Group B packets are transmitted on the second channel F2.

Figure 21:
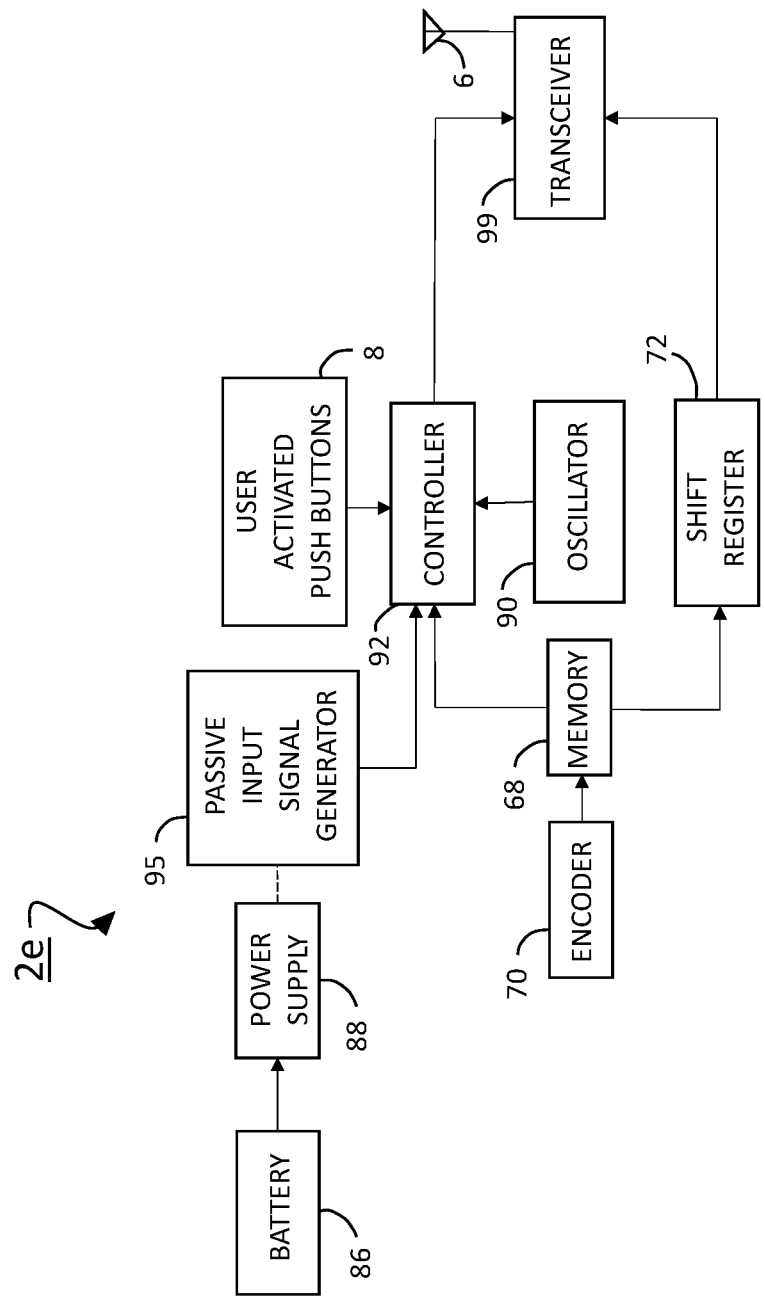
FIG. 21 is a block diagram of another example of a wireless transmitter according to the present disclosure which may be used in the multi-channel barrier operator system of FIG. 1.

Another example of an RF transmitter 2e suitable for use in the barrier operating system 1 of FIG. 1 is depicted in FIG. 21. Transmitter 2e is configured for transmission of data on one channel at any given time in response to user actuation of one or more push buttons 8. Many of the illustrated components of wireless transmitter 2e are similar to those of wireless transmitters 2a-2d and the description of these components and their functions is not repeated only for the sake of brevity. The primary difference between wireless transmitter 2e and wireless transmitter 2d is the addition of a transceiver 99. Transceiver 99 is configured to transmit to a receiver of a barrier operator but is also configured to monitor channels for interference using a receive function.

Transceiver 99 may include components associated with the transmit functionality of transmitter 2d (including but not limited to an RF oscillator, a modulator, an RF amplifier, an antenna matching circuit, etc.) and may also include components associated with the receive functionality of the receiver 12 (including but not limited to an LNA, mixer, BPF, IF amp, demodulator, RF oscillator, etc.). In this regard, the transceiver 99 includes the components necessary to provide both transmit and receive functionality.

Figure 22:
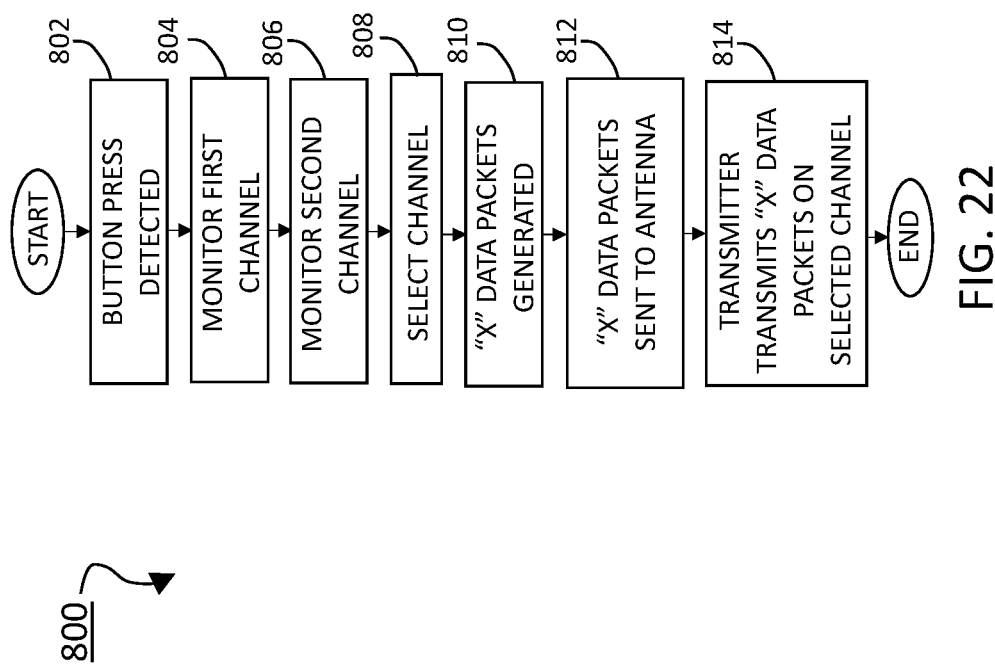
FIG. 22 is a flow chart of a method of operation of a wireless transmitter which may be implemented with the wireless transmitter of FIG. 21.

Turning now to FIG. 22, a method of operation 800 of wireless transmitter 2e is illustrated. The method 800 begins at process 802 in which it is detected that a push button 8 has been pressed. In response, the transmitter activates the transceiver 99 to scan the various channels on which the transmitter is configured to operate. In this regard, scanning the various channels may include, at process 804, monitoring a first channel. Monitoring a channel may include one or more of a number of activities including, for example, detecting interference in the environment that may inhibit transmission on that channel or determining a signal strength. In the case of determining a signal strength, it is contemplated that that a barrier operator 4 may include a transceiver similar to transceiver 99 or a separate transmitter. The barrier operator 4 may be configured to continuously or periodically broadcast a test signal that is receivable by transceiver 99. Alternately, a receiver may be configured to transmit a test signal anytime following receipt of one or more packets from the wireless transmitter. In this regard, monitoring a channel may include receiving a test signal from a barrier operator and determining a signal strength of the received test signal. At process 806, transceiver 99 may be used to monitor a second channel in a similar fashion to monitoring the first channel at process 806. It will be appreciated that additional monitoring may be performed if the transmitter is configured to operate on additional channels (e.g., a third channel).

At a process 808, the controller of the wireless receiver may select a channel for use in transmission. The selection may be based on the results of the monitoring. For example, the controller may select the channel that exhibited the least interference during monitoring (e.g., processes 804 and 806) or may select the channel that received a test signal with the greatest signal strength.

At process 810, a number "X" of data packets are generated and sent through the above-described components of a transceiver to the antenna 6 at process 812. It should be understood that "X" could include one packet but in most examples will include a predetermined integer number of identical packets greater than or equal to two. For example, five identical packets, or five identical sets of packets needed to convey a complete message, can be generated. At process 814, the data packets are transmitted on the selected channel.

It will be appreciated that order of processes of method 800 may be reordered for a particular application. For example, in order to reduce latency between a button press and transmission of data packets, process 810 may run in parallel to one or more of processes 804-808. Further, in some examples, processes 804-808 may occur or re-occur after process 814. In this regard, data packets may be transmitted to the receiver on a channel selected in response to a previous button press and then the wireless transmitter may monitor channels and select a channel that is to be used upon the next received button press. This may be particularly suitable for use with a receiver that is configured to transmit a test message following receipt of data packets from a wireless transmitter.

Further, a barrier operator may be configured to receive data packets from a wireless transmitter via two or more channels. The controller 44 or main controller 14 may analyze the reception of the packets via each channel and determine which channel exhibited the most preferred conditions (e.g., least interference or greatest signal strength). The transceiver of the barrier operator may then transmit a message, which may be a test message as described above, back to the transceiver of the wireless transmitter. The message may include an indication of which channel exhibited the most preferred conditions. The wireless transmitter may then select that channel for use in a subsequent transmission. In this regard, the wireless transmitter 2e may "listen" for a message from the barrier operator for a period of time following each transmission to the barrier operator.

Figure 23:
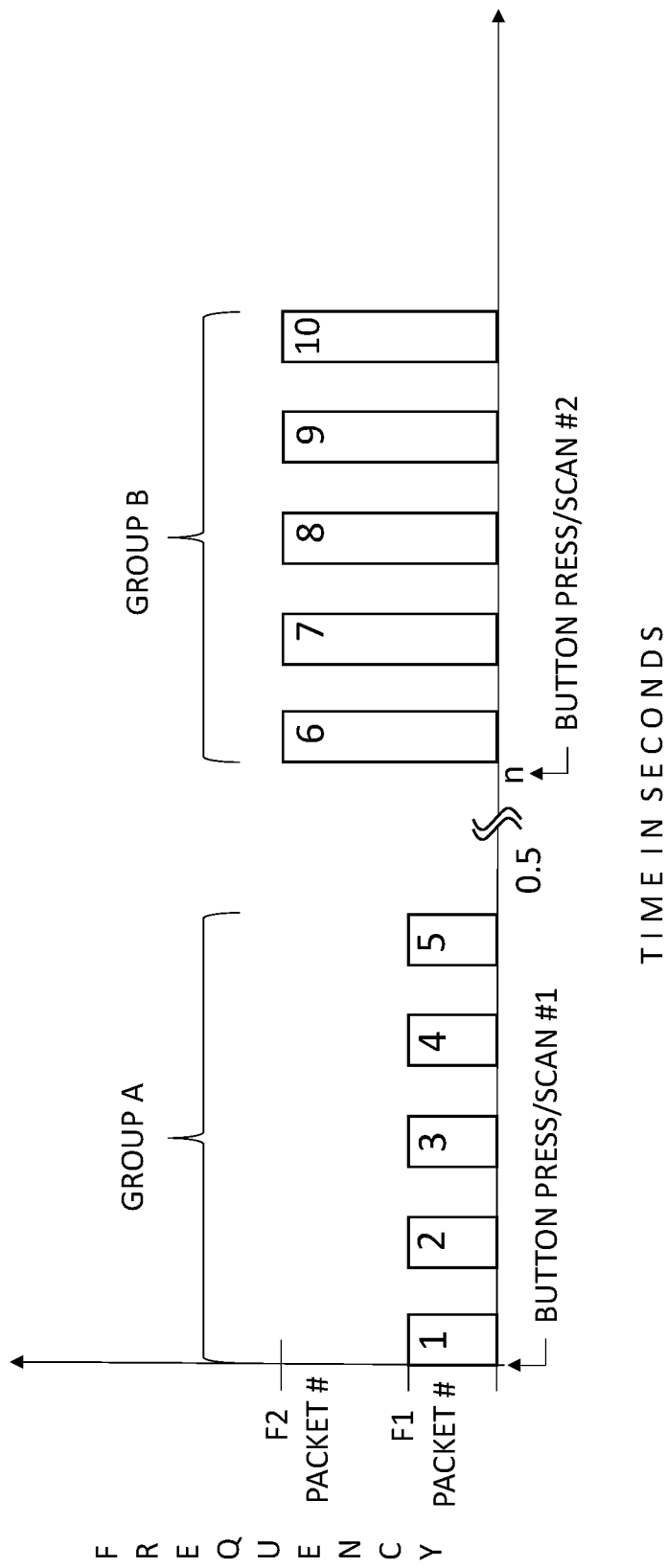
FIG. 23 illustrates another example RF transmitter timing diagram which may correspond to the method of FIG. 22.

FIG. 23 illustrates an example packet output in accordance with method 800. The Group A packets are transmitted on the first channel F1. Channel F1 is selected based on first scan of both F1 and F2 that is initiated by the first button press, the first scan indicating channel F1 is preferred over channel F2. A subsequent second button press results in the Group B packets being transmitted on the second channel F2. Channel F2 is selected based on a second scan of F1 and F2 that is initiated by the second button press, the second scan indicating channel F2 is preferred over channel F1.

As discussed in relation to method 800, the use of channel F1 for transmitting Group A may be based on scanning performed in response to a previous button press (before time=0). Similarly, the use of channel F2 for transmitting Group B may be based on scan #1 performed in response to the first button press. The channel selected based on scan #2 may then be used for a subsequent third button press.

One advantage to method 800 is that use of a transceiver in a multi-channel wireless transmitter may allow for improved communications with a barrier operator by identifying the most suitable channel for transmission and then transmitting only on that channel, as opposed to transmitting across a number of channels. Additionally, transmission only on the most suitable channel may improve battery life by reducing redundant transmissions across multiple channels.

It will be appreciated that each of the transmitters described herein (wireless transmitters 2a, 2b, 2c, 2d, 2e) are considered to be a multi-channel wireless transmitter as that term is used herein as they may operate on separate and distinct channels (e.g., 310 MHz, 315 MHz, 390 MHz), may operate at different transmission frequencies within a particular channel, or both. It will further be appreciated that some techniques described herein recite generating or transmitting "X" data packets on a first channel and generating or transmitting "X" data packets on a second channel. In some examples, the same number of packets may be used and in other examples, different numbers of packets may be used. In that regard, "X" as used herein does not necessarily refer to the same number in each separate instance. In some examples, when a frequency is changed from a first channel to a second channel during a transmission, "X" data packets being transmitted on the second channel may refer to the number of data packets in a Group minus the number of packets in that group which have already been transmitted on the first channel.

Further the designations F1 and F2 are not necessarily references to the same frequencies in each figure and each description which uses those channel designations. Rather, F1 and F2 are merely generic indications of a first channel and a second channel and may encompass any suitable transmission channels.

Many of the illustrated examples herein recite a first channel and a second channel. However, it will be appreciated that any number of channels may be used. In this regard, a method described herein which recites a process related to a first channel and then a process related to a second channel may be modified by repeating relevant steps to further provide a process related to a third channel. Further, as recited above, it should be appreciated that any number of redundant packets may be transmitted in each Group (e.g., one or twenty) and further a complete message may require two or more packets such that separate packets numbered in the figures may represent a complete message including two or more packets. In this regard, when additional channels (e.g., a third channel) are used, redundant packets (whether a single packet or a set of packets is used) may be transmitted on the additional channels during the respective method.

Additionally, it will be appreciated that, even where not specifically recited in a description of a method herein, each of the described methods may include changing a rolling code between successive Groups of packets such that Group A packets include a different encrypted code than the Group B packets (and/or Group C packets where relevant, particularly if a third channel is used). This may be particularly applicable to examples in which a meaningful period of time (e.g., 1 one more seconds) elapses between transmission of successive Groups. However, it is also contemplated that, in each of the examples, the Group B packets may have the same rolling code as the Group A packets. In some cases, the rolling code may be changed with each separate button press.

In the description, specific details have been set forth describing some examples. Numerous specific details are set forth in order to provide a thorough understanding of the examples. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure.

Elements described in detail with reference to one example, example, implementation, or application optionally may be included, whenever practical, in other examples, implementations, or applications in which they are not specifically shown or described. For example, if an element is described in detail with reference to one example and is not described with reference to a second example, the element may nevertheless be claimed as included in the second example. Thus, to avoid unnecessary repetition in the foregoing description, one or more elements shown and described in association with one example, implementation, or application may be incorporated into other examples, implementations, or application unless specifically described otherwise, unless the one or more elements would make an example or implementation non-functional, or unless two or more of the elements provide conflicting functions. Similarly, it should be understood that any particular element, including a system component or a method process, is optional and is not considered to be an essential feature of the present disclosure unless expressly stated otherwise.

Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure. In addition, dimensions and temporal relationships provided herein are for providing specific examples and it is contemplated that different sizes, dimensions, relationships and/or ratios may be utilized to implement the concepts of the present disclosure. To avoid needless descriptive repetition, one or more components or actions described in accordance with one illustrative example can be used or omitted as applicable from other illustrative examples. For the sake of brevity, the numerous iterations of these combinations will not be described separately. For simplicity, in some instances the same reference numbers are used throughout the drawings to refer to the same or like parts.

The methods described herein are illustrated as a set of operations or processes. Not all of the illustrated processes may be performed in all examples of the methods. Additionally, one or more processes that are not expressly illustrated or described may be included before, after, in between, or as part of the example processes. In some examples, one or more of the processes may be performed by a controller and/or may be implemented, at least in part, in the form of executable code stored on non-transitory, tangible, computer or machine-readable media that when run by one or more processors may cause the one or more processors to perform one, some, or all of the processes described in relation to the methods herein. Elements illustrated in block diagrams herein may be implemented with hardware, software, firmware, or any combination thereof. One block element being illustrated separate from another block element does not necessarily require that the functions performed by each separate element requires distinct hardware or software but rather they are illustrated separately for the sake of description.

One or more elements in examples of this disclosure may be implemented in software to execute on one or more processors of a computer system such as a controller. When implemented in software, the elements of the examples of the present disclosure are essentially the code segments to perform the necessary tasks. The program or code segments can be stored in a processor readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read only memory (ROM), a flash memory, an erasable programmable read only memory (EPROM); a floppy diskette, a CD-ROM, an optical disk, a hard disk, or other storage device. The code segments may be downloaded via computer networks such as the Internet, Intranet, etc. Any of a wide variety of centralized or distributed data processing architectures may be employed. Programmed instructions may be implemented as a number of separate programs or subroutines, or they may be integrated into a number of other aspects of the systems described herein. In one example, the control system supports wireless communication protocols such as Bluetooth, IrDA, HomeRF, IEEE 802.11, DECT, and Wireless Telemetry.

Note that the processes and displays presented may not inherently be related to any particular computer or other apparatus. Various general-purpose systems may be used with programs in accordance with the teachings herein, or it may prove convenient to construct a more specialized apparatus to perform the operations described. The required structure for a variety of these systems will appear as elements in the claims. In addition, the examples of the present disclosure are not described with reference to any particular programming language. It will be appreciated that a variety of programming languages may be used to implement the teachings of the present disclosure.

In some instances, well-known methods, procedures, components, and circuits have not been described in detail so as not to unnecessarily obscure aspects of the examples.

While certain exemplary examples of the present disclosure have been described and shown in the accompanying drawings, it is to be understood that such examples are merely illustrative of and not restrictive on the broad disclosure herein, and that the examples of the present disclosure should not be limited to the specific constructions and arrangements shown and described, since various other modifications may occur to those ordinarily skilled in the art.

What is claimed is:

1. A wireless transmitter for controlling a barrier operator, comprising:
    at least one processor;
    an encoder configured to encrypt at least a portion of a first data packet;
    an antenna;
    a first oscillator configured to generate a first carrier wave at a frequency of a first channel;
    a second oscillator configured to generate a second carrier wave at a frequency of a second channel;
    a first modulator configured to modulate the first data packet into the first carrier wave;
    a second modulator configured to modulate the first data packet into the second carrier wave;
    a diplexer configured to multiplex the first carrier wave and the second carrier wave; and
    a memory storing instructions that, when executed by the at least one processor, cause the at least one processor to concurrently:
        (a) transmit a first data packet configured to initiate actuation of the barrier operator on a first channel via the antenna; and
        (b) transmit the first data packet on a second channel via the antenna.

2. The wireless transmitter of claim 1, wherein transmitting the first data packet configured to initiate actuation of the barrier operator on the first channel via the antenna comprises transmitting a first plurality of instances of the first data packet sequentially in response to a first actuation of a button of the wireless transmitter, and wherein transmitting the first data packet on the second channel via the antenna comprises transmitting a second plurality of instances of the first data packet sequentially in response to the first actuation of the button.

3. The wireless transmitter of claim 2, wherein the first data packet includes a first code segment, and wherein the memory further stores instructions that, when executed by the at least one processor, cause the at least one processor to:
    generate a second code segment using a rolling code algorithm and insert the second code segment into a second data packet configured to initiate actuation of the barrier operator; and
    in response to a second actuation of the button, concurrently:
        (a) transmit the second data packet on the first channel via the antenna; and
        (b) transmit the second data packet on the second channel via the antenna.

4. The wireless transmitter of claim 1, wherein the memory further stores instructions that, when executed by the at least one processor, cause the at least one processor to:
    detect an extended actuation of a button after transmitting the first data packet on the first channel; and in response to detecting the extended actuation of the button, transmit the first data packet on the second channel in response to a second actuation of the button.

5. The wireless transmitter of claim 1, wherein the first data packet transmitted on the second channel comprises a rolling code portion that is different than a rolling code portion of the first data packet transmitted on the first channel.

6. A wireless transmitter for controlling a barrier operator, comprising:
   at least one processor;
   an actuator;
   an oscillator configured to generate a carrier wave; and
   a memory storing instructions that, when executed by the at least one processor, cause the at least one processor to:
      (a) manipulate a frequency of the carrier wave to sweep across a frequency band; and
      (b) transmit a first data packet configured to initiate actuation of the barrier operator on the carrier wave while the carrier wave sweeps across the frequency band, wherein a sweep speed and data transmission rate of the wireless transmitter are configured such that the entire first data packet is transmitted while the carrier wave is within a tolerance bandwidth of a channel on which the barrier operator is configured to receive the first data packet.

7. The wireless transmitter of claim 6, wherein transmitting the first data packet while the carrier wave sweeps across the frequency band comprises sequentially transmitting a plurality of instances of the first data packet.

8. The wireless transmitter of claim 7, wherein the carrier wave sweeps from a starting frequency to a terminal frequency during the transmitting a plurality of instances of the first data packet.

9. The wireless transmitter of claim 8, wherein the memory further stores instructions that, when executed by the at least one processor, cause the at least one processor to transmit the first data packet in response to a first actuation of the actuator and, in response to a second actuation of the actuator, to:
   manipulate the frequency of the carrier wave to sweep across the frequency band from the starting frequency to the terminal frequency; and
   transmit a second data packet configured to initiate actuation of the barrier operator on the carrier wave while the carrier wave sweeps across the frequency band.

10. The wireless transmitter of claim 9, wherein the second data packet comprises a rolling code segment that is different than a rolling code segment of the first data packet.

11. A wireless transmitter for controlling a barrier operator, comprising:
   at least one processor;
   an accelerometer;
   an actuator; and
   a memory storing instructions that, when executed by the at least one processor, cause the at least one processor to:
      (a) transmit a first data packet configured to initiate actuation of the barrier operator on a first channel in response to actuation of the actuator;
      (b) detect, using the accelerometer, movement of the wireless transmitter; and
      (b) transmit the first data packet on a second channel in response to detecting the movement of the wireless transmitter.

12. The wireless transmitter of claim 11, wherein the actuation of the actuator continues through the detecting the movement of the wireless transmitter and through the transmitting the first data packet on the second channel.

13. The wireless transmitter of claim 11, wherein the transmitting the first data packet on the second channel is further in response to a second actuation of the actuator.

14. A wireless transmitter for controlling a barrier operator, comprising:
   at least one processor;
   an antenna; and
   a memory storing instructions that, when executed by the at least one processor, cause the at least one processor to:
      transmit a first data packet configured to initiate actuation of the barrier operator on a first channel via the antenna;
      detect an extended actuation of a button after transmitting the first data packet on the first channel, wherein the extended actuation of the button is detected by comparing a length of a button press to a threshold value; and
      in response to detecting the extended actuation of the button, transmit the first data packet on a second channel via the antenna in response to a second actuation of the button.

* * * * *